US010798557B2

(12) United States Patent
Birrane, III et al.

(10) Patent No.: US 10,798,557 B2
(45) Date of Patent: Oct. 6, 2020

(54) SPACE-BASED LONG TERM EVOLUTION (LTE) COMMUNICATIONS ARCHITECTURE

(71) Applicant: The Johns Hopkins University, Baltimore, MD (US)

(72) Inventors: Edward J. Birrane, III, Ellicott City, MD (US); David J. Copeland, Silver Spring, MD (US); Brian K. Haberman, Sykesville, MD (US); Philip F. Chimento, Jr., Rockville, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 16/556,818

(22) Filed: Aug. 30, 2019

(65) Prior Publication Data

US 2020/0204978 A1 Jun. 25, 2020

Related U.S. Application Data

(60) Provisional application No. 62/782,612, filed on Dec. 20, 2018.

(51) Int. Cl.
*H04W 4/00* (2018.01)
*H04W 8/14* (2009.01)
*H04W 80/02* (2009.01)
*H04W 36/00* (2009.01)
(Continued)

(52) U.S. Cl.
CPC .......... *H04W 8/14* (2013.01); *H04W 36/0022* (2013.01); *H04W 36/0038* (2013.01);
(Continued)

(58) Field of Classification Search
CPC ......... H04W 28/0252; H04W 28/0268; H04W 28/0289; H04W 72/1242;
(Continued)

(56) References Cited

U.S. PATENT DOCUMENTS 10,084,535 B1 9/2018 Speidel et al.
10,389,691 B2 * 8/2019 Zhu ...................... H04L 9/0841
(Continued)

OTHER PUBLICATIONS

3GPP, 3GPP TS 21.101, 3rd Generation Partnership Project; Technical Specification Group Services and System Aspects; Technical Specifications and Technical Reports for a UTRAN-based 3GPP system (Release 5), 2009, 24 pages.

*Primary Examiner* — Joseph Arevalo
(74) *Attorney, Agent, or Firm* — Todd R. Farnsworth

(57) ABSTRACT

A wireless communication system may include an SGW operably coupled to a PGW to setup a session responsive to a request from a terminal to establish the session between the terminal and the PGW. The system further includes an MME configured to authenticate the terminal and provide bearer management in response to the request. The MME is configured to provide bearer information to the SGW. The system also includes base stations operably coupled to the SGW via a data plane connection and operably coupled to the MME via a control plane connection. The base stations are configured to handover connection to the terminal between the base stations in response to movement of the terminal between coverage areas of the base stations. The MME is configured to assign a deferred bearer in response to a determination that suitability criteria for establishing an active bearer are not met, the deferred bearer reserving a future data bearer and signaling the terminal to store data locally until the future data bearer is established.

18 Claims, 11 Drawing Sheets

(51) Int. Cl.
*H04W 76/27* (2018.01)
*H04W 88/16* (2009.01)
*H04W 36/32* (2009.01)

(52) U.S. Cl.
CPC ........... *H04W 36/32* (2013.01); *H04W 76/27* (2018.02); *H04W 80/02* (2013.01); *H04W 88/16* (2013.01)

(58) Field of Classification Search
CPC ....... H04W 12/00514; H04W 36/0022; H04W 36/0066; H04W 36/14; H04W 60/00; H04W 60/06; H04W 8/02; H04W 92/02
USPC ......... 455/453, 434, 436, 458, 435.1, 435.2, 455/437, 406, 404.1
See application file for complete search history.

(56) References Cited

U.S. PATENT DOCUMENTS

| | | | | |
|---|---|---|---|---|
| 2007/0099561 | A1* | 5/2007 | Voss | H04W 24/00 455/12.1 |
| 2007/0287473 | A1* | 12/2007 | Dupray | H04W 4/029 455/456.1 |
| 2011/0270994 | A1* | 11/2011 | Ulupinar | H04W 76/15 709/227 |
| 2012/0058775 | A1* | 3/2012 | Dupray | G01S 5/0257 455/456.1 |
| 2012/0170548 | A1* | 7/2012 | Rajagopalan | H04W 36/22 370/331 |
| 2013/0167181 | A1* | 6/2013 | Dixit | H04N 21/64784 725/95 |
| 2013/0285855 | A1* | 10/2013 | Dupray | G01S 19/48 342/451 |
| 2013/0287012 | A1* | 10/2013 | Pragada | H04W 76/25 370/338 |
| 2014/0059662 | A1* | 2/2014 | Zhu | H04L 9/3271 726/6 |
| 2014/0279458 | A1* | 9/2014 | Holman | G06Q 20/227 705/40 |
| 2016/0112896 | A1* | 4/2016 | Karampatsis | H04W 28/0252 370/230.1 |
| 2017/0070923 | A1* | 3/2017 | Li | H04W 36/0066 |
| 2017/0303322 | A1* | 10/2017 | Watfa | H04W 76/11 |
| 2019/0159157 | A1* | 5/2019 | Gupta | H04W 36/14 |
| 2019/0357106 | A1* | 11/2019 | Ke | H04W 36/023 |

* cited by examiner

SPACE-BASED LONG TERM EVOLUTION (LTE) COMMUNICATIONS ARCHITECTURE

CROSS-REFERENCE TO RELATED APPLICATIONS

This application claims the benefit of U.S. Provisional Application No. 62/782,612 filed on Dec. 20, 2018, the entire contents of which are hereby incorporated herein by reference.

TECHNICAL FIELD

Example embodiments generally relate to wireless communications and, more particularly, relate to an architecture for a communication network for terminals that do not have regular access to infrastructure, such as a spacecraft, unmanned aerial vehicle (UAV), or mobile Internet of things (IoT) device.

BACKGROUND

The Long-Term Evolution (LTE) protocol suite is the de facto standard for cellular communications systems. LTE provides a wealth of benefits for both network operators and end users. The shift from circuit-switched communications to an Internet Protocol (IP) infrastructure enables end user devices to support a wide variety of applications beyond voice calls. The IP infrastructure also allows for seamless integration between the traditional voice network and the Internet. This seamless integration further enables global communication between disparate devices. Moreover, devices can effectively roam throughout the entire cellular communication system domain and generally receive high quality service through reliable and robust wireless connectivity almost everywhere the system provides coverage.

LTE has been very successful in relation to bringing terrestrial wireless communications to a cutting-edge level. Moreover, as the number of satellites and other devices orbiting the Earth have continued to expand, the fundamental problem of satellite communications develops characteristics similar to terrestrial cellular communications, namely the need for dynamic access to mobile users, coordination between network nodes for optimized handling of the user base, and increasing pressure on the constrained network resources of bandwidth and link capability. Currently, the area of space communications is divided into separate domains and communications techniques have developed in each respective domain. High speed data communications may be possible in each respective domain. However, services in each respective domain are generally only available to devices that are configured specifically for operation in a corresponding specific one of the domains. There exists the need to provide a union across these domains and to bring LTE-like flexibility to space communications overall. Furthermore, the development of such capability in space communications provides mechanisms for extending capability to other mobile use cases, including aircraft, high altitude craft, and nautical craft.

Accordingly, it may be desirable to provide a union of different provider domains including, for example, traditional ground station networks, relay constellations in low-earth orbit (LEO) or medium-earth orbit (MEO), and geosynchronous orbit (e.g., tracking and data relay satellites (TDRS)). A union of different communication techniques (e.g., multiband radio frequency (RF), optical, ground-space, space-ground, and space-space) may also be desirable.

BRIEF SUMMARY OF SOME EXAMPLES

In one example embodiment, a wireless communication system is provided. The system includes a serving gateway (SGW) operably coupled to a packet data network gateway (PGW) to setup a session responsive to a request from a terminal to establish the session between the terminal and the PGW. The system further includes a mobility management entity (MME) configured to authenticate the terminal and provide bearer management in response to the request. The MME is configured to provide bearer information to the SGW. The system also includes a plurality of base stations operably coupled to the SGW via a data plane connection and operably coupled to the MME via a control plane connection. The base stations may be configured to handover connection to the terminal between the base stations in response to movement of the terminal between coverage areas of respective said base stations. The MME may be configured to assign a deferred bearer in response to a determination that suitability criteria for establishing an active bearer are not met, the deferred bearer reserving a future data bearer and signaling the terminal to store data locally until the future data bearer is established.

In another example embodiment, an apparatus for establishing a deferred bearer in a wireless communication system supporting both terrestrial and space-based terminals is provided. The system may include an SGW operably coupled to a PGW to setup a session responsive to a request from a terminal to establish the session between the terminal and the PGW. The apparatus may include processing circuitry configured to define a brokering service to make requests for the deferred bearer by reserving a future data bearer in response to suitability criteria not being met for establishing an active bearer.

In another example embodiment, a method for allocating bearers in a wireless communication system including terrestrial assets and space-based assets is provided. The method includes receiving, by an MME, an attachment request from a terminal and selecting a corresponding SGW and PGW responsive to authentication of the terminal by the MME. The method further includes determining whether suitability criteria are met, and assigning a deferred bearer if not. The terminal stores data associated with the deferred bearer until a future data bearer is available. Knowledge of a future location of a base station is used to reserve the future data bearer at a future contact time.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
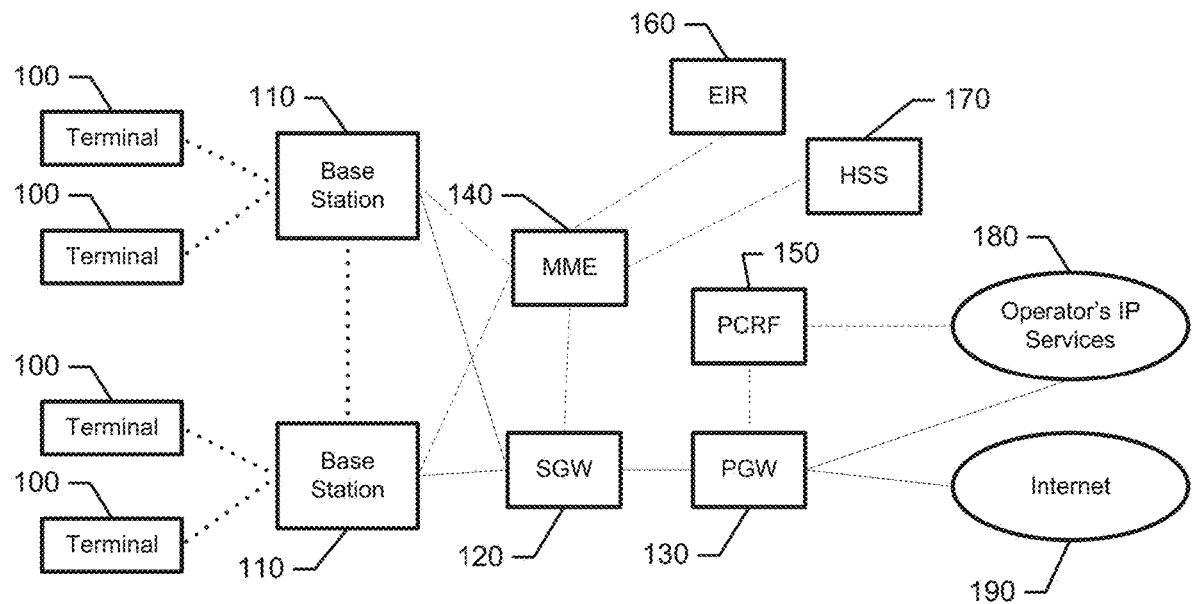
FIG. 1 illustrates a functional architecture of the current 3GPP standards.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments. As used herein, the phrase "operable coupling" and variants thereof should be understood to relate to direct or indirect connection that, in either case, enables functional interconnection of components that are operably coupled to each other. Of note, the term "LTE" is used often herein, and various components of a 4G-LTE system are described herein by way of example and not limitation. As such, the term LTE and the specific components thereof, which are described below, are not intended to limit the extensions described herein to be extensions from 4G-LTE. Instead, example embodiments can apply equally to 3G, 4G, 5G and future iterations of LTE, and the examples are provided to illustrate the extension primarily from 4G-LTE. Thus, all LTE definitions should be appreciated as non-limiting examples of definitions that may apply to an example system that can be extended as described herein. However, the definitions themselves may change as networks continue to evolve. That said, for further clarification regarding any particular one of the definitions, 3GPP TR 21.101 (which is hereby incorporated by reference in its entirety) should be consulted.

As used in herein, the terms "component," "module," "system," "device" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of example, both an application running on a computing device and/or the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

The term "terminal" as used herein may be referred to as a mobile station (MS), user equipment (UE), a user terminal (UT), a wireless terminal, an access terminal (AT), a subscriber unit, a subscriber station (SS), a wireless device, a wireless communication device, a wireless transmit/receive unit (WTRU), a mobile node, a mobile, a satellite or other terms. Various embodiments of the terminal may include a cellular phone, a smart phone having a wireless communication function, a personal digital assistant (PDA) having a wireless communication function, a wireless modem, a portable computer having a wireless communication function, a capturing device such as a digital camera having wireless communication function, a game device having a wireless communication function, a music storage and replay appliance having a wireless communication function, an Internet appliance enabling wireless Internet access and browsing, and terminals or a portable unit having combinations of the functions, but example embodiments of the present invention are not limited thereto.

The term "base station" as used herein may indicate the collective name for a node-B, an eNode-B, a base transceiver system, an access point, ground station, etc. The base station may exchange signaling data with a Mobility Management Entity (MME) and signal end-user (bearer) data with the Serving Gateway (SGW). The base station provides connectivity for a terminal to the radio access network (RAN) and the evolved packet core (EPC). The base station generally manages radio resources, radio bearers, admission control, link encryption, terminal mobility, data mobility, etc. The base station's connection to the EPC occurs over logical interfaces which, in LTE parlance, include the "S1" interface. The S1 interface is used for control plane functions via the MME and data plane functionality with the SGW.

The term "Mobility Management Entity" (MME) as used herein may correspond to a primary control function for the LTE access network. The MME serves multiple SGWs and is responsible for selecting the appropriate PGW when a terminal initially attaches to a network. The MME is also responsible for selecting a serving SGW when the terminal attaches and also during a handover of the terminal to a different cell. The MME processes all signaling between terminals and the EPC. The MME also provides connection management and bearer management for a terminal's requesting service. When a terminal generates a Connection Request, the MME creates a UE Context that holds user subscription information retrieved from the Home Subscriber Server (via the S6a interface (detailed below)). The MME also performs the mutual authentication phase that establishes the security keys used for encrypting bearers.

Once the mutual authentication phase is performed, the MME establishes the bearer(s) associated with the terminal. This is accomplished by signaling the relevant bearer information to the SGW via an interface (e.g., the S11 interface in LTE parlance).

The term "Serving Gateway" (SGW) as used herein corresponds to a gateway device configured to serve multiple base stations. The SGW terminates the interface towards the terminals and base stations. At the time a terminal attaches to the network and during handover events, the MME assigns the best SGW (generally based on network topology) to support that terminal. The SGW functions as the user-plane anchor point for inter-stations handover. The SGW routes end-user (bearer) data to the PGW over a dedicated interface (e.g., the S5 interface in LTE parlance). Thus, the SGW serves as the local mobility anchor for bearers when the terminal moves between base stations. If a terminal is idle and a bearer has data destined for the terminal, the SGW buffers that data while the terminal is paged. The SGW interfaces with base stations via an S1-U (detailed below) interface to deliver data to/from the terminal. When terminals are visiting a network, the visited SGW collects information for the billing/charging functions.

The term "Packet Data Network Gateway" (PGW) also relates to an interface towards the terminals and base stations. In this regard, the PGW terminates an interface, i.e., the SGi interface in LTE parlance, towards external packet data networks (PDNs). The PGW provides connectivity between a terminal and external PDNs by providing a single point of entrance and exit for traffic destined for or originating from the terminal. The PGW is selected by the MME at the time that the terminal attaches to the network. The terminal generally remains anchored to the assigned PGW until it detaches from the network or its default bearer is dropped. The PGW may be responsible for terminal IP address allocation among its other functional responsibilities. The PGW may also responsible for quality of service (QoS) enforcement on bearers, and anchoring mobility actions. Information needed to enforce QoS policies may be obtained from the policy and charging rules function (PCRF) via an interface referred to as the Gx interface. Data flowing to/from the terminal from/to external networks may traverse the PGW's SGi interface with the external networks and the S5/S8 interface between the PGW and the SGW. Given that the PGW is the termination point of bearers, the PGW may serve as the logical point for policy enforcement, deep packet inspection, and billing/charging support.

The term "Home Subscriber Server" (HSS) as used herein relates to a central database that contains all user-related data and related communication channel information. This data may include QoS profiles, access restrictions for roaming, and connection information for available PDNs. The HSS may also be configured to maintain information indicating a current location of terminals, tracked via the MME to which the subscriber is currently registered. From an authentication and authorization perspective, the HSS may also integrate an Authentication Center (AuC). The AuC may generate security information from user credentials (e.g., keys). The security information generated may enable mutual authentication (between a terminal and the network) and integrity/confidentiality of data and control plane exchanges. The HSS therefore supports terminal authentication and access authorization, session establishment and mobility management. IP address assignment may be performed by the HSS.

The term "Equipment Identity Register" (EIR) relates to a database that identifies terminals that are either banned from connecting to the network or that have their service monitored for illicit activities. Terminals are typically identified by an International Mobile Equipment Identifier (IMEI) number. The MME may query the EIR during connection establishment to determine whether an identified terminal should be allowed to connect to the network.

The term "S5/S8 Interface" as used herein relates to a primary interface between the SGW and PGW. (S5 and S8 may be functionally identical; however S8 supports roaming between two/multiple carriers). The S5 interface provides user plane tunneling and tunnel management between the SGW and PGW. The S5 interface enables the SGW to connect with multiple PGWs in order to provide different IP services to the UE (for example a non-collocated PGW for required PDN connectivity). It also enables SGW re-location resulting from mobility of a terminal (for example, a handover of the terminal to an eNB supported by a different SGW).

With respect to the term "Bearer—Default Bearer and Dedicated Bearer" as used herein, in LTE standards, bearers carry all data and signaling traffic. Default bearers are assigned to a terminal when the terminal attaches to the network. The default bearer is assigned an IP address and remains associated with the terminal for as long as the terminal is attached to the network. Thus, all signaling and data traffic generally employs the default bearer. Where a special handling beyond the scope of the default bearer (usually associated with QoS is required, for example Voice over LTE (VoLTE), certain video streaming, etc.) a dedicated bearer will be assigned to the terminal. The dedicated bearer employs the same IP address as the default bearer but provides the specific QoS requirements of the protocol being employed. The dedicated bearer is terminated when the special needs IP session ends.

FIG. 1 illustrates a functional diagram of a conventional LTE architecture. Referring to FIG. 1, the diagram provides a high-level overview of the functionality relevant to example embodiments and as defined by 3GPP Enhanced Packet Core (EPC) standards. The diagram therefore shows a functional overview of the 3GPP LTE E-UTRAN (Evolved Universal Terrestrial Radio Access Networking) making up the radio components of the LTE standards and the EPC, which are the signaling and data functional components of the LTE standards. The diagram also identifies the specific inter-functionality interfaces.

In this regard, as shown in FIG. 1, multiple terminals 100 may be capable of communicating with respective instances of base stations 110. The base stations 110 may have a data plane connection to the SGW 120, which is in turn in communication with the PGW 130. The base stations 110 may also each have a control plane connection to MME 140. The PGW 130 may interface with PCRF 150 as described above to handle billing/charging support.

As noted above, during a connection phase for a terminal, the identity of the terminal may be used to determine (e.g., via EIR 160) whether the terminal 100 is to be granted access to the network, and the MME 140 may also obtain subscription information via HSS 170. Thereafter, the terminal 100 may be enabled to access operator's IP services 180 and/or the Internet 190.

At the time at which one of the terminals 100 attaches to the network, the terminal 100 will select a serving cell from among the base stations 110 based on which one could be considered as the best available one of the base stations 110 (often based on signal strength). During the attachment process, the MME 140 will assign a specific instance of the SGW 120 to the terminal 100. The selection of the SGW 120 is generally based on network topology and location of the terminal 100. The MME 140 will also assign the PGW 130 to the terminal 100. The terminal 100 then becomes "homed" and/or "anchored" to the PGW 130 that was assigned. Traffic is tunneled between the SGW 120 and the PGW 130 via the S5 interface. All user data originating from the terminal 100 or destined for the terminal 100 will exit or enter the network through the PGW 130 for as long as the terminal 100 remains attached to the network. The IP address of the terminal 100 is also associated with the PGW 130 until the terminal 100 detaches from the network.

As the terminal 100 travels across the network, the terminal 100 may require handover between different ones of the base stations 110. The decision on when to switch base stations 110 is normally made on the basis of changes in signal strength, as mentioned above. If the terminal 100 requires handover to an instance of the base stations 110 that is not supported by the SGW 120 that was initially assigned, then SGW re-location is orchestrated by the MME 140 and a new SGW is assigned to the terminal 100. While the SGW 120 is changed, the PGW 130 to which the terminal 100 is "homed" and "anchored" generally does not change. As a result, the S5 interface implements a re-location and user data is tunneled between the newly assigned SGW and the PGW 130 to which the terminal 100 is anchored.

For operation of conventional LTE, the components described in reference to FIG. 1 generally operate simply as described above in order to provide a seamless user experience as the terminal 100 moves between base stations HO in the manner described above. Within this context, all of the base stations 110 are generally fixed in location. However, the integration of non-terrestrial (e.g., space-based) components into the system of FIG. 1 may necessitate some significant changes in order to account for various new variables or other issues that arise with space-based components, but which are generally not an issue in entirely terrestrial contexts. For example, although the base stations 110 of FIG. 1 are generally fixed, the base stations for servicing earth-orbiting satellite and other space-based terminals can exist in a number of domains, including earth-bound, fixed location with fixed coverage beams; earth-bound, fixed-location with tracking coverage; geosynchronous orbit; low-earth orbit or mid-earth orbit; or beyond the proximity of Earth and in cis-lunar space or at a Lagrange point. Additionally, terminals on spacecraft can have very different movement profiles including speed and trajectory than the movement profiles of terminals on land. Thus, the general behavior of both the terminals 100 and the base stations 110 can be expected to be very different in a space-based LTE (S-LTE) environment where significantly higher Doppler effects, latency (e.g., due to propagation delays greater than 4 milliseconds (msec)), and variations in latency can be expected. Furthermore, a space-based LTE communications link will experience longer range between base station and terminal (400 km to 48,000 km for terminals in earth environment). The corresponding higher path loss necessitates the use of more directional antennas at either the base station or terminal for high data rate links. Links involving wide-coverage antennas will necessarily support only low data rates.

There are unique differences in communications and network behavior between the service offered to space-borne terminals and terrestrial terminals. The latency difference between the closest terminal to a base station and the farthest terminal on a terrestrial link is less than 50 microseconds, thus allowing the LTE protocol to operate assuming a tight time synchronization between all terminals operating in a cell and the base station servicing that cell. For a network servicing space-borne terminals, this difference in latency will be much larger, on the order of 3 msec for a ground-based base station to over 30 msec for a base station in geosynchronous orbit or employing geosynchronous relay. Management of this increased time difference is beyond the capabilities of current LTE systems. Moreover, terrestrial terminals can be expected to move at relatively low speed, and thus terrestrial LTE systems are designed to handle mobile speeds up to approximately 350 km/hour. A space-based terminal will move at speeds up to approximately 8 km/second. The increased Doppler shift from these speeds is beyond the capability of terrestrial LTE systems. LTE cell towers generally provide blanket coverage within their cell range, and within this coverage can provide multiple-access high-data rate service through relatively broad sectors. In contrast, the infrastructure in a space-based system is not likely to provide broad high-data rate service due to an increased dependence on directionality from the base station; thus, the blanket coverage for true multiple-access activity with space-based terminals will be limited to relatively low data rate transactions and coverage for high data rate activity must require the dynamic apportionment of directional apertures to users, similar to how LTE apportions bandwidth. In LTE, the network is generally available or not, and if the network is not available, service is simply not available to terminal. In a space network environment, disruptions in service are both expected and anticipated, as are large variations in the quality of service such that future contacts can be planned that more closely match a required request for service. Thus, the extension of service to allow for future contact (the deferred bearer) allows the network to both mitigate outage and plan for matching service aspects (such as data rate and security) to terminals' needs. Overall, creation of an architecture for non-terrestrial LTE or S-LTE should expand the capabilities of LTE in specific areas that enable the integration of new components to answer these unique differences.

In addition to differences in behavior (and possibly also due to some of the differences in behavior) terminals and base stations in an S-LTE environment may be expected to require more services than those which are normally provided in LTE. Data and control flow changes should therefore be anticipated. However, given the many strengths offered by the LTE protocol suite, and its ubiquitous nature in current communication systems, bridging the gaps described above is much more preferable to attempting to build an entirely new system. Accordingly, creation of an architecture for non-terrestrial LTE or S-LTE should expand the capabilities of LTE in specific areas that enable the integration of new components, but the architecture should also be backward compatible so that existing LTE (and perhaps also existing space telecommunications) devices can continue to function within the system in the same way they used to function in their respective systems in the past. Thus, commodity hardware that is already distributed should be allowed to continue in use, in some cases basically unchanged. To the extent new features are introduced, those new features would most desirably be enabled based on extensions to existing protocols (e.g., the definition of new information elements).

Figure 2:
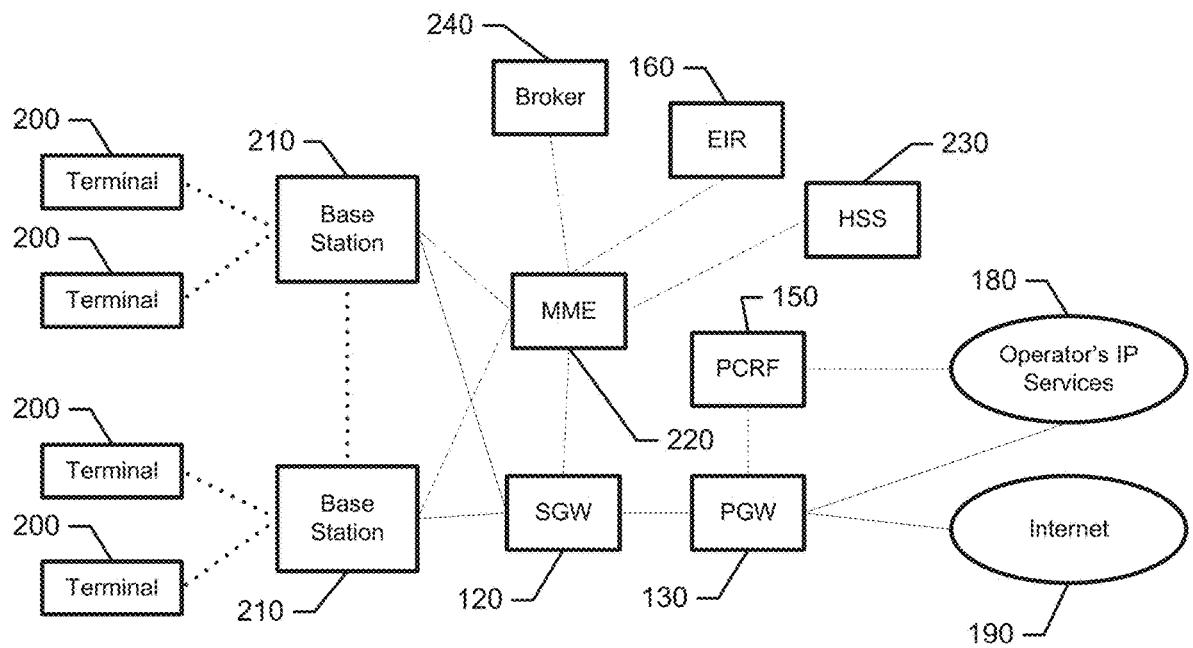
FIG. 2 illustrates an architecture capable of supporting non-terrestrial (e.g. space-based) assets in accordance with an example embodiment.

FIG. 2 illustrates an example S-LTE architecture that may be capable of meeting the goals set forth above, in combination with appropriate changes to interface protocols. For example, the S-LTE architecture of FIG. 2 may be capable of utilizing suitability criteria to determine when to use a new concept, i.e., a deferred bearer, when the availability of an appropriate bearer cannot be confirmed for data that is to be communicated off a device (e.g., a terminal). Thus, for example, when a dedicated or default bearer does not exist, when existing bearers cannot be predicted to deliver a data set until after the "time-to-live," or when existing bearers would not transmit the data set prior to expiration of the bearers, the deferred bearer can be employed. In FIG. 2, those devices that share the same reference number as a corresponding entity from FIG. 1 can be understood to be duplicated from conventional LTE to S-LTE with little or no modification. Meanwhile, some commonly named components that will likely require modification are renumbered in FIG. 2 relative to the numbering provided in FIG. 1. This number modification is meant to indicate the fact that the component itself is likely to also be modified. Some of those modifications may include augmentations to the capabilities of such devices (e.g., to handle the new information elements) or the inclusion of new devices capable of processing such new information elements. However, some other modifications may include the augmentation of certain entities with the ability to perform entirely new functions. Thus, the S-LTE architecture may further require one or more new actors and/or functions that will be described in greater detail below. It is worth noting again, however, that backward compatibility is a goal of the architecture. Thus, although terminals and base stations are indicated as being subject to modification, it should be appreciated that existing devices will not need to be completely replaced. Within the context of the architecture in FIG. 2, this is especially applicable for devices operating the extended packet core functions.

Example embodiments for providing the S-LTE architecture may be expected to operate without modification to the SGW 120, the PGW 130, the PCRF 150, the EIR 160, the operator's IP services 180 and the Internet 190. However, terminals 200 may include the terminals 100 of FIG. 1 plus an additional set of terminals that are on spacecraft, for example. Thus, the terminals 200 may operate similarly to those described above except that each of the terminals 200 may be equipped to include or handle any new information elements that are defined for the S-LTE architecture. Similarly, the base stations 210 of FIG. 2 may include the base stations 110 of FIG. 1 plus an additional set of base stations (e.g., satellites and supporting ground equipment) that are at various different orbits, and other base stations on the ground that are configured to interface with the satellites. The legacy base stations (i.e., base stations 110) and the base stations that have been added to communicate with spacecraft may be equipped to include or handle any new information elements that are defined for the S-LTE architecture.

Referring still to FIG. 2 by way of comparison to FIG. 1, the MME 140 and HSS 170 of FIG. 1 may each be augmented for S-LTE. In this regard, for example, in order to support S-LTE, the MME 140 and the HSS 170 of FIG. 1 may be updated to the MME 220 and HSS 230, respectively of FIG. 2. For the HSS 230, the AuC of the HSS 170 may be upgraded to support the identity mechanism selected (e.g., host identity protocol (HIP)) for identifying entities in the S-LTE architecture. The requirements for identification of terminals 200 may drive the updates to databases of the HSS 230. Additionally, the subscriber information associated with the terminals 200 may be augmented for the HSS 230 to support space mission operations. In some cases, the identification of terminals 200 that support space assets may include some unique information that correlates such terminals 200 to space assets. Thus, it can perhaps be determined based on the identifying information itself whether a particular one of the terminals 200 is associated with terrestrial or space assets.

One of the primary functions of the MME 140 is to execute the Identity and Security procedures to establish mutual authentication between a given access network and the terminals 200 attaching to the network. In LTE, much of the authentication is done using the International Mobile Equipment Identity (IMEI) of the terminals 100. In order to support S-LTE, a new identification paradigm may be developed for use within the identification procedure. Thus, the MME 220 may be configured to add functionality to support the new identification paradigm. In one example embodiment, as mentioned above, the HIP defined in request for comments (RFC) 7401 (i.e., HIPv2) may be used to define new identities that include identities for space components. Additionally or alternatively, the MME 220 may be configured with signaling and information elements that support a brokering service associated with broker 240 as described in greater detail below. Logistical information needed by the base stations 210 to support the brokering service of the broker 240 will be managed by the MME 220 via a control plane interface to the base stations 210 (e.g., an S1-MME interface).

The broker 240 may be a server or other network component that is configured as described herein to provide brokering services that are necessary to account for several of the new functions and capabilities that are required to extend LTE to support S-LTE. In this regard, for example, the broker 240 may be configured to manage cross-provider negotiation for future service, and therefore provides functionality not previously provided in LTE. As such, the broker 240 may be a logical component added specifically for S-LTE to enable cross-provider negotiation, which allows users and network providers (of different networks of the same type, or different types of networks) to coordinate the use of high capacity downlink resources when needed by one of the terminals 200. Furthermore, the broker 240 may provide coordination of assets of the network to which it belongs to allow a network to establish a deferred bearer without the need for assets from peer networks. As an example, since there will be large variation in the capacity and quality of service immediately available to a terminal through a current default or dedicated bearer, a new network function is necessary to plan and then execute a future service to fulfill a terminal's needs. The system of FIG. 2 may therefore introduce the concept of a "deferred bearer" and the broker 240 may be configured to negotiate the use of the deferred bearers, when appropriate. The deterred bearer is a latency-tolerant bearer that is created by employing storing and forwarding techniques. In some cases, when a deferred bearer is assigned, the fact of assigning the deterred bearer informs the terminals 200 and/or the base stations 210 that it is not possible to set up an active end-to-end data bearer for the desired transmission of data. Thus, when the deferred bearer is identified, the terminal 200 and/or the base station 210 may store data for later delivery when an active bearer (i.e., the future data bearer) can be scheduled. This is an effect that was neither possible nor needed in conventional LTE. Thus, as the MME 220 and/or the broker 240 handle bearer assignment (or bearer management), the determination as to whether current bearer capabilities are insufficient and therefore local data storage should be initiated until the future data bearer can be scheduled are significant parts to the bearer management that the MME 220 and/or broker 240 otherwise engage in. Thus, within S-LTE, arbitrary latency may be allowed across established bearers by enabling negotiation for use of the deferred bearer. This ability to schedule future bearers also enables the MME 220 and/or the broker 240 to reserve future network capabilities proactively. The a priori negotiation of a deferred bearer therefore allows a provider to pre-provision base stations 210 prior to flyovers by terminals 200 needing high-bandwidth access to ground stations for either future network capability reservations or for handling situations where suitability criteria for establishing a bearer are not met. The suitability criteria may include, for example, a minimum peak data rate of available bearers required to transport data that is to be communicated within a time window allotted for the communication. As another example, the suitability criteria may include security of available bearers meeting minimum standards for the transmission of sensitive information (assuming that security is sufficient for network control communications). In some cases, the suitability criteria may include resource availability (e.g., relating to state of charge of communication devices, impending handoff of service where the trajectory of the terminal 200 will dictate an impending cessation of current bearers, requirements to conserve mission resources such as where the terminal 200 must postpone the transmission of data until more desirable environmental conditions are met, or foreknowledge of data capacity needs such as where the user mission uses a deferred bearer to reserve network capacity for a time when the mission requirements can be used to predict a need for data transfer).

The negotiation may require knowledge of the locations (now and in the future) of the entities involved in formation of the future data bearer. Thus, in some cases, the MME and/or broker 240 may be provided with such location information and a set of rules for determining how long data can reasonably be stored at terminals 200 and/or base stations 210 and how to store such data (or direct storage thereof) to ensure delivery when the future data bearer can be established. As such, the terminals 200 and/or base stations 210 may have processing circuitry including memory and processor components (e.g., similar to those described below in reference to FIG. 6) configured to employ storage paradigms, rules and/or guidelines for handling local storage of data associated with the deferred bearer, and for handling retrieval, rescheduling of transmission attempts, etc. Furthermore, unique to the space environment, the movement of space-borne terminals is highly deterministic; therefore network elements including the MME, the Broker, and the base station may employ orbit determination calculations to predict the future locations of terminals.

Within conventional LTE, an Access Network Discovery and Selection Function (ANDSF) is provided. The ANDSF is designed to assist terminals 100 in discovering non-3GPP access networks, such as that can be used for data communications. The ANDSF therefore provides discovery information to the terminal 100 that identifies networks in the vicinity of the terminal 100. In order to extend LTE, the S-LTE architecture may be configured to utilize the S14 interface between the terminals 200 and the ANDSF to pre-populate future base station 210 contacts. The broker 240 may additionally or alternatively include another interface, e.g., Serviced Based interface (SBi) that may be a control plane interface used to negotiate the contents of the ANDSF repository based on future needs of the terminals 200.

Figure 3:
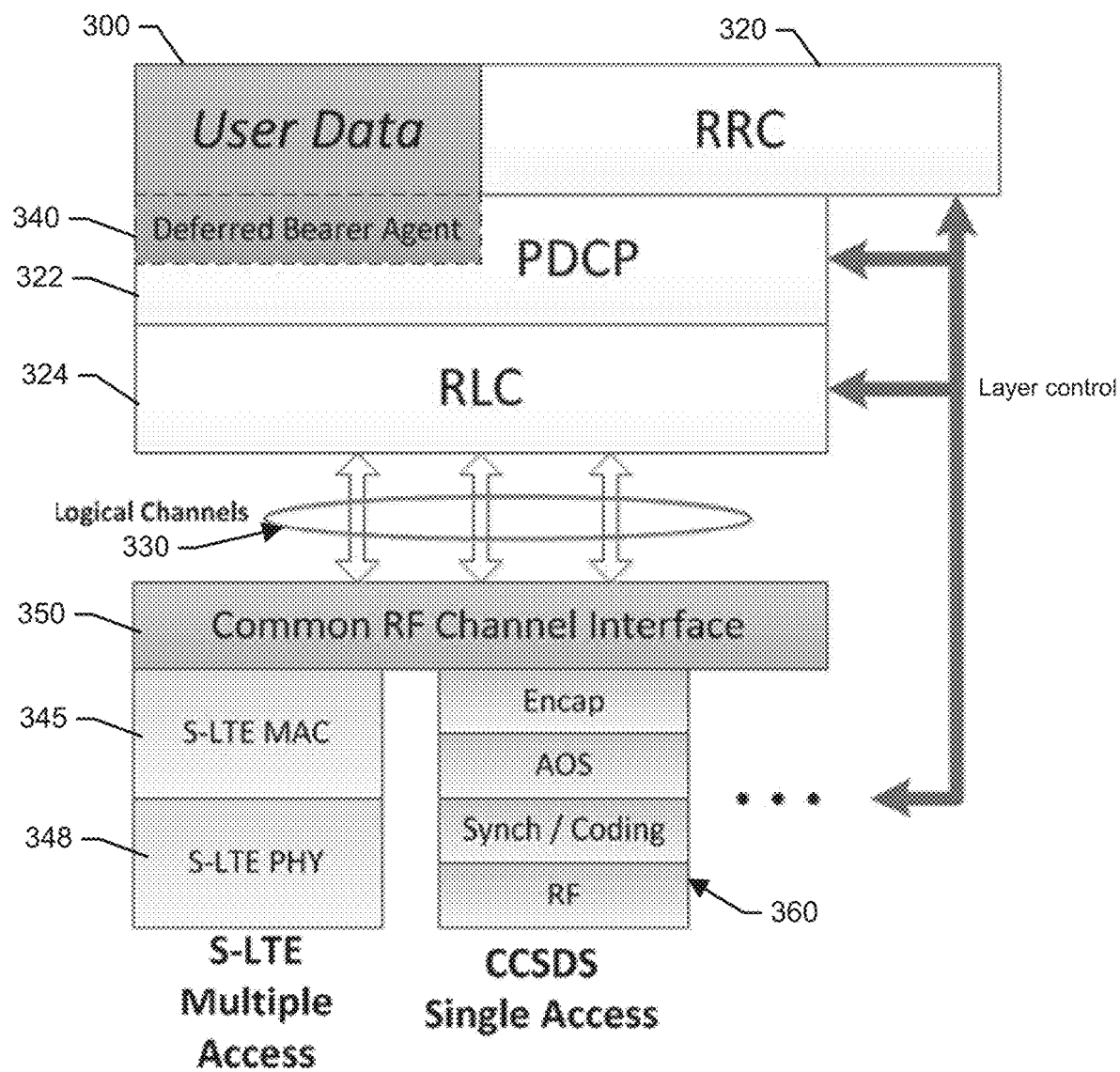
FIG. 3 is a block diagram of various components of the protocol stack for the terminals and the base stations according to an example embodiment.

Some other logical interfaces may be modified to support S-LTE. For example, the LTE-Uu interface is the radio interface between the terminal 100 and the RAN. In some cases, the LTE-Uu interface may be updated to include functions and features needed to operate in the RF bands associated with space-based communication. As noted above, the Uu interface must be resilient to increased Doppler dynamics and variations in time delay that are endemic to space communications. FIG. 3, shows the protocol stack for the S-LTE Uu Interface. S-LTE introduces new elements to the protocol stack for the Uu interface. For S-LTE, a new element called the Common RF Channel Interface (CRCI) 350 may be included in the protocol stack. This interface provides a convergence point for different RF interfaces to be present. In this manner, the S-LTE stack provides a mapping of LTE functionality on top of a number of possible RF protocols and waveforms. This allows support of traditional spacelink protocols (for example, the CCSDS AOS protocol suite), as well as accommodating new RF protocols defined specifically for S-LTE. Secondly, the Uu interface, as shown in FIG. 3, includes a Deferred Bearer Agent 340 embedded in the PDCP layer 322. This agent handles the implementation of the store-and-forward functions of the deferred bearer. The LTE X2 interface connects the base stations 110 for both control and data plane functions, particularly to support handovers. The X2 interface is optional in two scenarios. First, the X2 interface need not be used when all base stations 110 within a provider's network are directly connected. Typically, the connectivity exists between base stations 110 that are topologically close and could be involved in an LTE handover scenario. Secondly, the X2 interface need not be used when the X2 interface cannot be deployed at all. In this scenario, the handover event is orchestrated within the EPC.

The control plane function of the X2 interface manages the data exchange when one of the terminals 100 is transferred from one of the base stations 110 to another (i.e., a handover event). The X2 interface may also be involved in handovers involving changing radio access technologies. In such cases, the X2 interface may include information elements that are exchanged between base stations in order to facilitate such handovers. During the handover event, the base stations 110 transfer information related to the management of the terminal 100 (e.g., bearer information). Additionally, the X2 control interface manages the data exchange between base stations 110 while the handover is in process. This is done by negotiating a tunnel over the X2 interface as a part of the data plane. The X2 interface's data plane function tunnels data plane traffic to/from the terminal 100 while the handover procedure is in process. The tunnel ensures reliable delivery of data while the underlying radio connection between the terminal 100 and the E-UTRAN is being updated. For support of S-LTE, and the terminals 200 and base stations 210 described above, the X2 interface will handle handovers that include the deferred bearer described above. In other words, the X2 interface will handle handovers that include additional latency beyond that which could have been tolerated in conventional LTE.

The S1-MME interface provides control plane connectivity between the E-UTRAN and the MME 140. The S1-MME interface reliably delivers LTE signaling information related to the connection establishment procedure for terminals 100. This includes carrying information elements related to terminal identity, bearer setup and management, and terminal mobility. The introduction of the bearer 240 and the update of the MME 220 will include the configuration of the S1-MME interface to handle the deferred bearer. Thus, for example, orbit information may also be sent from the MME 220 to the base station that will provide a future bearer via the S1-MME interface.

The S1-U interface provides data plane connectivity between the E-UTRAN and the SGW 120. The S1-U interface therefore carries the bearer tunnel between the SGW 120 and the base stations 210 currently serving the terminal 200 in S-LTE. The S1-U interface also carries the inter-base station tunnels utilized during handover events. Although the S1-U interface may be made to be latency tolerant, tolerance of latency is not required for the S1-U interface when the logical caching provided by the deferred bearer of an example embodiment is employed. In this regard, the use of the deferred bearer will cause caching at the terminal 200 to hold data that cannot be sent until later.

The S11 interface is a control plane interface between the MME 220 and the SGW 120. The information elements exchanged over the S11 interface support session creation and deletion, default and dedicated bearer creation and deletion, bearer modification and terminal handover (with and without SGW relocation).

The S13 interface provides connectivity between the MMF 220 and the EIR 160 to support identity checking procedures for terminals 200. Thus, for example, if one of the terminals 200 is reported as blacklisted or stolen, the S13 interface utilizes the Diameter proto defined in RFC 3588, and replaced by RFC 6733. Thus, little or no change may be required to the S13 interface to support S-LTE.

The S14 interface provides control plane connectivity between terminals 200 and the ANDSF. The S14 interface may therefore be employed for signaling information between the terminal 200 and the broker 240 regarding contact information for currently available high-bandwidth links. The S14 interface may also provide for exchange of future contact information, and the bandwidth or time constraints associated with available links in order to support S-LTE.

The S5/S8 interface provides both control plane and data plane connectivity between the SGW 120 and PGW 130, as noted above. The control plane aspect of the interface focuses on bearer management between the SGW 120 and the PGW 130 to cover both bearer setup and teardown as well as bearer mobility during a handover event where SGW relocation occurs. On the data plane side, this interface is traversed for all bearers carrying data to/from the anchoring PGW 130. The S5 and S8 interfaces may generally be similar, with relatively minor differences. In this regard, the S5 interface is used to connect SGWs and PGWs that are operated by the same provider, whereas the S8 interface connects SGWs and PGWs that are operated by different networks. In the latter instance, the security profile of the interface changes in order to ensure appropriate protections for data flowing over the interface. Thus, the S5/S8 interface is already configured to handle S-LTE architecture upgrades without modification.

The S6a interface provides control plane connectivity between the MME 220 and the HSS 230. The S6a interface allows for the exchange of subscriber information between the MME 220 and the HSS 230, The primary use for the S6a interface includes the retrieval of subscription information, authentication information, and authorization rules from the HSS 230. Thus, the addition of attributes for the identification and authorization of terminals 200 in S-LTE will upgrade the S6a interface for use in the S-LTE architecture of FIG. 2.

The Gx interface provides a control plane connection between the PCRF 150 and the PGW 130. The control plane interface allows the PCRF 150 to transfer routing and charging rules to the PGW 130 to enable a network provider to control the amount/types of information a specific user is allowed to send across the EPC. The information provided by the PCRF 150 to the PGW 130 allows the forwarding logic within the PGW 130 to associate each packet received to a specific policy rule to enable efficient billing for each of the terminals 100 anchored at the PGW 120. Thus, no modification of the Gx interface is necessary to support S-LTE.

The SGi interface provides the data plane connectivity between the PGW 130 and any external networks. The external networks may be a public or private networks operated by the same provider (i.e., the operators IP services 180) or may be, for example, the Internet 190. No modification of the SGi interface should be required to support S-LTE.

The LTE architecture defines multiple protocol stacks tailored to specific devices within the network. FIG. 3 is a block diagram of various components of the protocol stack for the Uu interface, between the terminals 200 and the base stations 210. Both the terminals and base stations implement this overall protocol stack. It should be noted that the user plane functions are agnostic to the underlying physical transport while many parts of the control plane are inherently tied to the physical transport mechanism.

User plane user data enters the protocol stack as shown in the User Data block 300. This data may be, for example, Internet Protocol (IP) traffic. Similarly, this data may be Bundle Protocol (BP) traffic. Likewise, control plane data originates and terminates at the terminal 200 in the radio resource control (RRC) protocol block 320. This control plane data may terminate at the base station 210 or continue further into the network such as to the MME 220. Both the user plane and control plane share paths through the lower layers of the stack, starting with the packet data convergence protocol (PDCP) and radio link control (RLC) protocol layers 322 and 324. The RLC layer 324 interfaces to the RF-specific layers through logical channels 330 which partition data by function.

The PDCP 322 is the convergence point within the LTE protocol stack for the user plane and the control plane (RRC 320). The PDCP 322 provides three core functions. The first function of the PDCP 322 is header compression. In the user plane, the PDCP 322 receives IP packets, adds a PDCP sequence number, compresses the IP headers to conserve bandwidth, and generates a protocol data unit (PDU) ready for transmission. The second function of the PDCP 322 is encryption. For both control and user plane, the PDCP 322 provides cryptographic functions to encrypt data being transmitted between the terminals 200 and the base stations 210. The third function of the PDCP 322 is integrity protection. For control plane traffic, the PDCP 322 provides integrity protection functions to ensure the control messages are not modified/damaged enroute between the terminals 200 and the base stations 210. For S-LTE, a fourth function is added: the deferred bearer agent 340. The deferred bearer agent 340 provides the data plane functions for deferred bearer operation, including the necessary storage and forwarding of user data.

The RLC protocol 324 maintains the data link between the terminals 200 and the base stations 210. The RLC transmit function receives data units from upper-layer protocols and sends that data as PDUs to the MAC protocol 345 on associated logical channels. PDUs received from the MAC layer are delivered to the upper-layer protocols. The RLC operates in one of three modes (e.g., transparent, acknowledged, and unacknowledged) on a per-channel basis. Transparent mode handles signaling messages such as paging and connection setup. Acknowledged mode handles data streams, such as Voice over IP (VoIP), which require timely delivery. Acknowledged mode is used for data that requires more reliability (e.g., email). The RLC protocol 324 provides a number of key features. First, the RLC protocol 324 provides data fragmentation and concatenation of upper-layer protocol data into PDUs handed to the MAC protocol 345. Second, the RLC protocol 324 provides in-order packet delivery to upper-layer protocols by performing any necessary re-ordering of PDUs received out of order from the MAC protocol 345. Third, the RLC protocol 324 performs error and duplicate detection and recovery of data received from the MAC protocol 345. Fourth, the RLC protocol 324 handles any retransmissions to recover from packet loss or corruption. Finally, the RLC protocol 324 performs flow control in order to manage the data rate of the sender.

As shown in FIG. 3, the terminals 200 and the base stations 210 may each include a CRCI 350 that maps RLC functions into RF-specific capabilities in order to augment the LTE protocol stack to support the S-LTE architecture of FIG. 2. The augmentation is achieved by segmenting RLC functions of the LTE protocol stack into a portion that maintains interfaces with the PDCP 322 and introducing the CRCI 350 to add new physical layers (i.e., S-LTE PHY 348) to the LTE system without overhauling the entire protocol stack. As shown in FIG. 3, a terminal and/or a base station may support one or more RI interfaces (two such interfaces are shown for example) to support different paradigms within the S-LTE. As an example, an S-LTE Multiple Access RF system is envisioned which provides resiliency to the Doppler and delay profiles incurred in space communications while providing LTE-like flexibility in the apportionment of bandwidth to terminals. In a second example, an RF system based on the Consultative Committee for Space Data Systems (CCCSDS) Advanced Orbiting Systems (AOS) protocol suite is envisioned for use with legacy space systems or for dedicated single-access base stations.

The MAC protocol 345 is responsible for controlling the low-level operation of the physical layer and scheduling data transmissions on the air interface. There is a single MAC entity in the terminals 200 and one in the base stations 210. The logical channel prioritization function determines how much data to transmit from each logical channel in each transmission interval. The MAC protocol 345 then pulls that data from the transmit buffers managed by the RLC protocol 324. The various data blocks associated with the data pulled from the transmit buffers are combined into MAC Protocol Data Units (PDUs) and sent to the physical layer via a transport channel. The MAC protocol 345 also uses control elements to manage the operation of the physical layer. The control elements are used to manage butlers, terminal identification, power, sleep mode, contention resolution, and scheduling. Many of the control elements are specific to the physical layer details.

The RRC protocol 320 provides three primary functions within the LTE stack. First, the RRC protocol 320 handles the broadcast of system information that is common to all systems within a communication cell. Second, the RRC protocol 320 manages connection control. Third, the RRC protocol 320 manages the collection and reporting of measurements to enhance network performance. The broadcast of system information applies to a variety of information. For terminals in an idle mode, the broadcasts contain information that is used as a part of cell selection, such as cell parameters and neighboring cell information. For terminals in a connected state, the broadcasts carry information such as common channel configuration information.

The control of connection state involves a variety of functions. The RRC protocol 320 is responsible for the setup, maintenance, and teardown of RRC-level connections. Security activation and initial configuration is also driven by the RRC protocol 320. In the case of connection mobility (handovers), the RRC protocol 320 is responsible for the update of frequencies, security associations, and context information transfers. The management of Resource Blocks (RBs) used for user data is also carried out by the RRC protocol 320. The RRC protocol 320 also handles radio configuration and quality of service control.

The primary function of the CRCI 350 is to provide an abstraction layer that maps all existing RLC responsibilities (e.g., logical channel mapping) into functions that are specific to the underlying physical layer. The abstraction allows the upper portions of the LTE protocol stack to remain agnostic to the underlying physical layer capabilities. For example, a Ka-band Single Access service may employ the CCSDS RF interface 360 shown in FIG. 3. Accordingly, example embodiments may solve the problem of dissimilarity in LTE and conventional space networks regarding a disagreement as to restricting communications to predetermined frequencies and rates by defining the CRCI 350 to insulate different radio characteristics.

Figure 4:
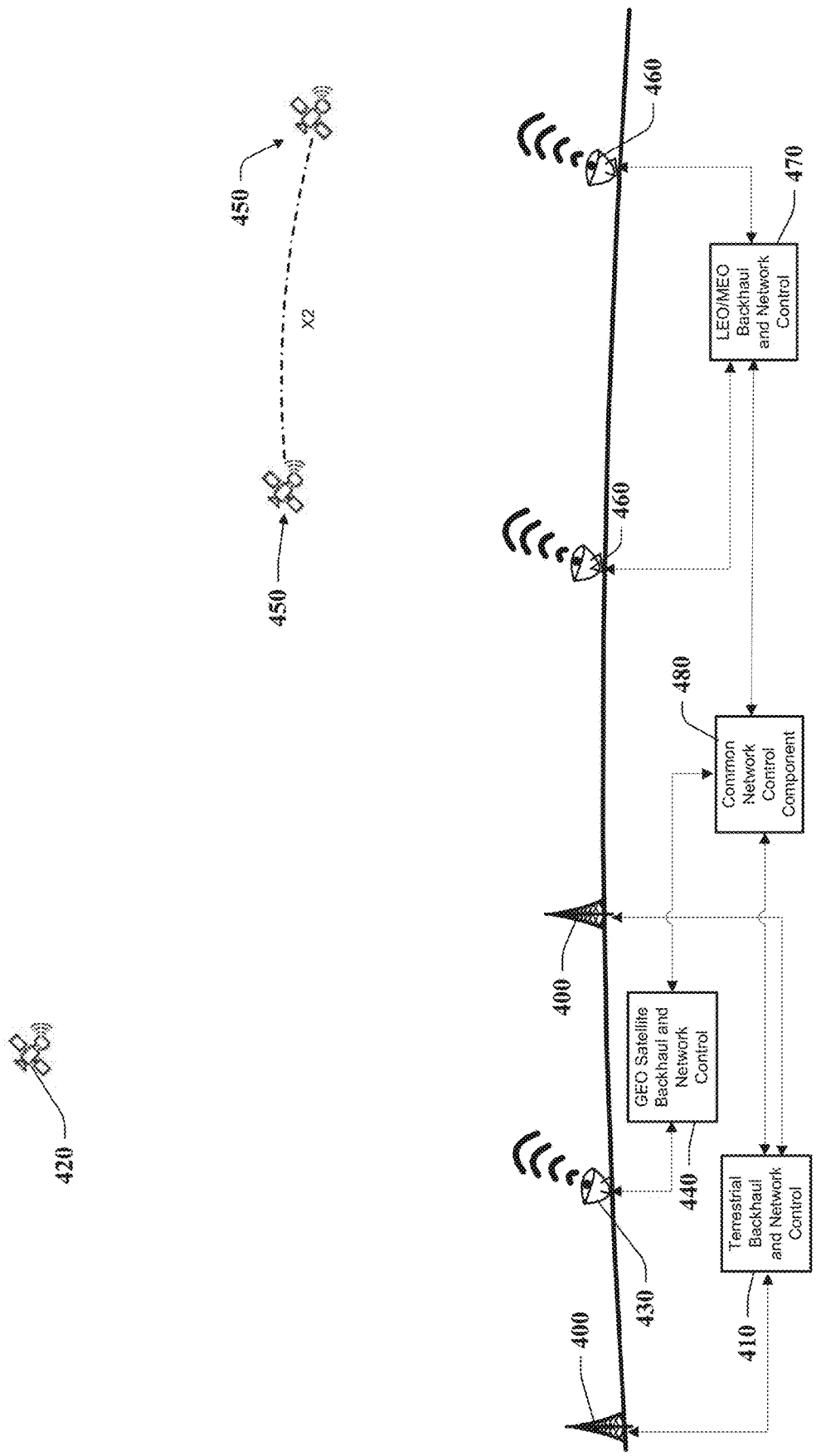
FIG. 4 is concept view of a system including multiple wireless communication providers that may be connected or connectable according to an example embodiment.

FIG. 4 is concept view of a system including multiple wireless communication providers (i.e., different home networks) that may be connected or connectable via example embodiments. In this regard, FIG. 4 illustrates three different home networks (each of a different type—e.g., terrestrial, LEO, MEO, etc.) that can all seamlessly be accessed by a terminal using an example embodiment of the system shown in FIG. 2 (and having terminals and base stations as shown in FIG. 3).

Referring to FIG. 4, when a terminal (either space-borne or terrestrial) may be capable of attaching to a first wireless communication network (i.e., a ground-based network) that may include a plurality of fixed, terrestrial base stations 400 that may be associated with one or multiple different network operators. The terrestrial base stations 400 may be operably coupled to a terrestrial backhaul and network control system 410 (e.g., an EPC for the terrestrial network), which may include one or more instances of the components shown in FIG. 2.

The terminal may also or alternatively be capable of attaching to one or more geosynchronous satellites 420 of a second wireless communication network (i.e., a geosynchronous satellite network). The geosynchronous satellites 420 may be operably coupled to corresponding ground stations 430 having antenna assemblies configured to communicate via wireless communication employing RF channels and frequencies associated with the geosynchronous satellite network. The ground stations 430 may be operably coupled to a geosynchronous satellite backhaul and network control system 410 (e.g., an EPC for the geosynchronous satellite network), which may include one or more instances of the components shown in FIG. 2.

The terminal may also or alternatively be capable of attaching to one or more LEO/MEO satellites 450 of a third wireless communication network (i.e., a LEO or MEO satellite network). The LEO/MEO satellites 450 may be operably coupled to corresponding ground stations 460 having antenna assemblies configured to communicate via wireless communication employing RF channels and frequencies associated with the LEO/MEO satellite network. The ground stations 460 may be operably coupled to a LEO/MEO satellite backhaul and network control system 470 (e.g., an EPC for the LEO/MEO satellite network), which may include one or more instances of the components shown in FIG. 2. In some cases, components of the EPCs of the respective networks may overlap or at least be capable of communication with each other via a common network control component 480, which may itself include one or more instances of the components shown in FIG. 2.

Figure 5:
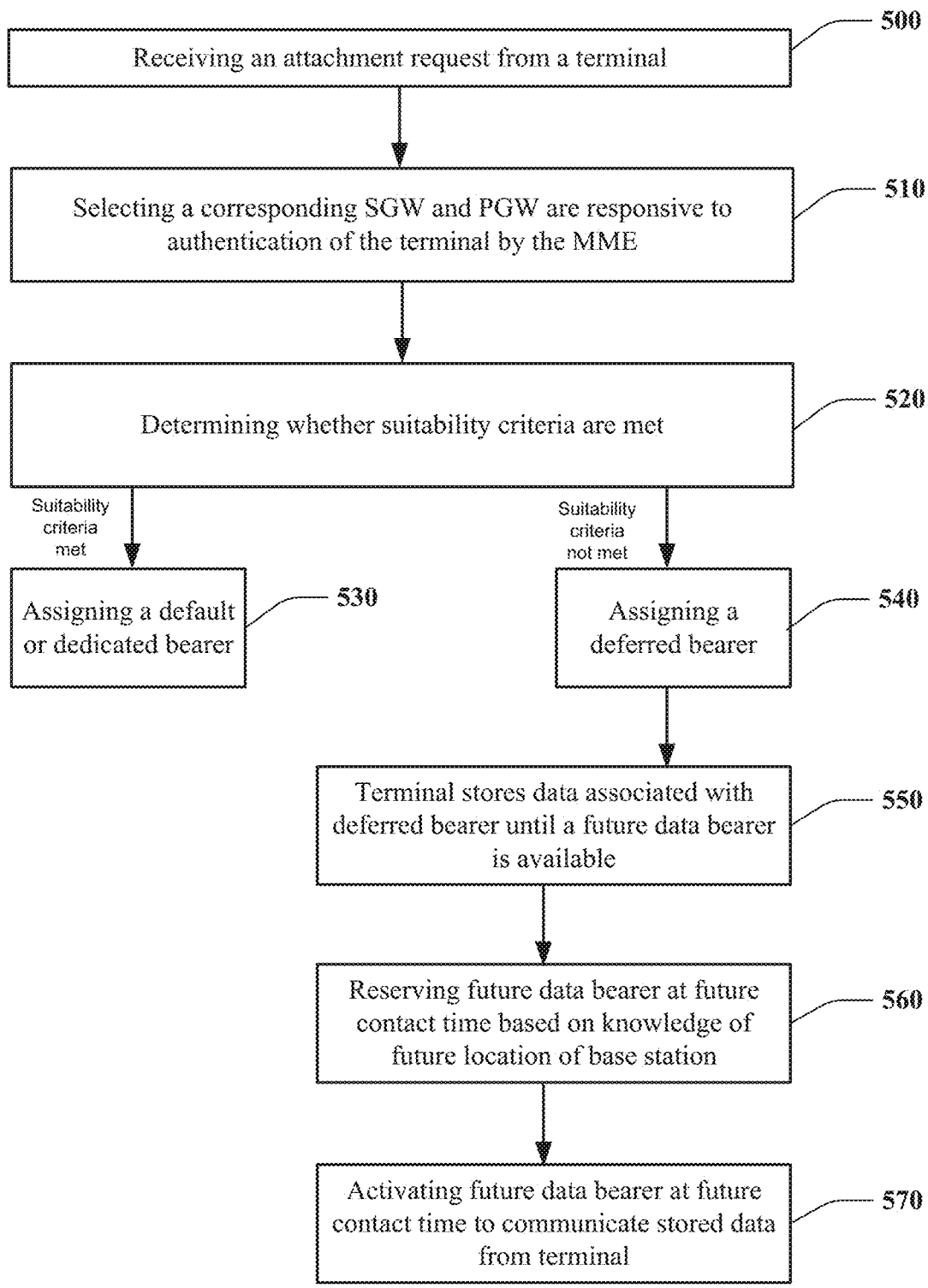
FIG. 5 is a block diagram of a method of allocating bearers in a wireless communication system including terrestrial assets and non-terrestrial (e.g., space-based) assets according to an example embodiment.

FIG. 5 illustrates a block diagram of a method of employing a deferred bearer in a wireless communication network according to an example embodiment. Referring to FIG. 5, the method may include, receiving an attachment request from a terminal 200 at operation 500, and selecting a corresponding SGW 120 and PGW 130 responsive to authentication of the terminal 200 by the MME 220 at operation 510. To the extent the terminal 200 is a space-based asset, the HSS 230 must provide identification information that includes an identifier associated with space-capable terminals 200 to the MME 220 for authentication. Thus, at operation 520, a determination may be made as to whether suitability criteria are met. In some cases, if the terminal 200 is a terrestrial asset or a space-based asset may be determined based on identification information of the terminal 200, and such information may be further helpful in association with deciding whether to assign a deferred bearer (e.g., since space-based assets may be more likely to require a deferred bearer). However, it should be appreciated that both space-based and terrestrial assets could use a dedicated or default bearer (if one is suitable), and both space-based and terrestrial assets could use deferred bearers (if no dedicated or default bearer is suitable). If the suitability criteria are met, then a default or dedicated bearer may be assigned at operation 530. However, if the suitability criteria are not met, then a deferred bearer may be assigned at operation 540. In response to the deferred bearer being assigned, the terminal 200 may begin storing data associated with the deferred bearer until a future data bearer is available at operation 550. Knowledge of a future location of base stations 210 that are mobile may then be used to reserve the future data bearer at a future contact time at operation 560. At the future contact time, the future data bearer may be activated and the stored data may be communicated from the terminal 200 at operation 570.

Figure 6:
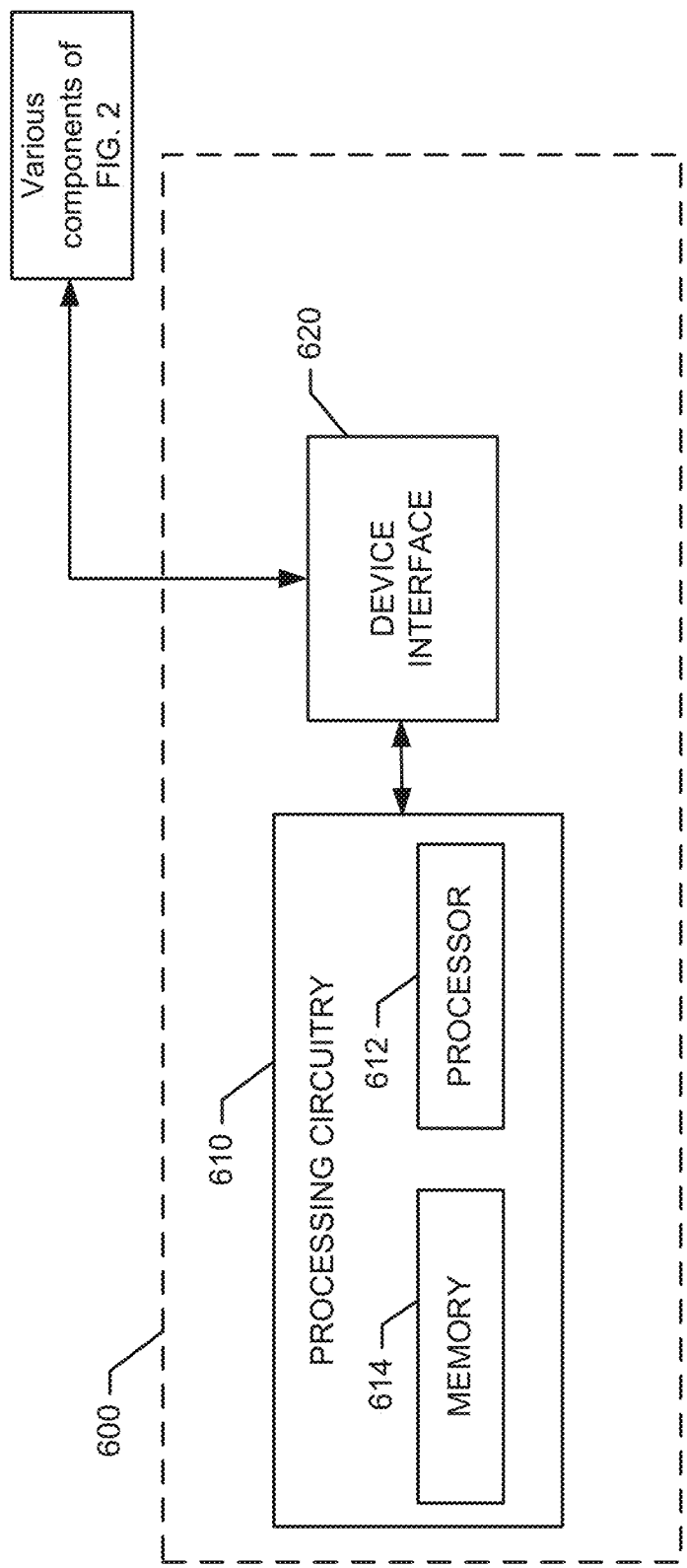
FIG. 6 illustrates a functional block diagram of an apparatus for allocating bearers according to an example embodiment.

FIG. 6 illustrates a functional block diagram of an apparatus 600 for establishing a deferred bearer in a wireless communication system supporting communication between both terrestrial and space-based terminals 200 according to an example embodiment. The apparatus 600 may be embodied as an example of the broker 240 of FIG. 2 or as a deferred bearer agent (DBA) 340 described in greater detail below. The apparatus 600 may include processing circuitry 610 configured to perform data processing, control function execution and/or other processing and management services according to an example embodiment of the present invention. In some embodiments, the processing circuitry 610 may be embodied as a chip or chip set. In other words, the processing circuitry 610 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 610 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 610 may include one or more instances of a processor 612 and memory 614 that may be in communication with or otherwise control a device interface 620. As such, the processing circuitry 610 may be embodied as a circuit chip (e.g., an integrated circuit chip) configured (e.g., with hardware, software or a combination of hardware and software) to perform operations described herein.

The device interface 620 may include one or more interface mechanisms for enabling communication with other devices (e.g., modules, entities and/or other components such as those shown in FIG. 2). In some cases, the device interface 620 may be any means such as a device or circuitry embodied in either hardware, or a combination of hardware and software that is configured to receive and/or transmit data from/to modules, entities and/or other components of the system of FIG. 2 that are in communication with the processing circuitry 610.

The processor 612 may be embodied in a number of different ways. For example, the processor 612 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 612 may be configured to execute instructions stored in the memory 614 or otherwise accessible to the processor 612. As such, whether configured by hardware or by a combination of hardware and software, the processor 612 may represent an entity (e.g., physically embodied in circuitry—in the form of processing circuitry 610) capable of performing operations according to embodiments of the present invention while configured accordingly. Thus, for example, when the processor 612 is embodied as an ASIC, FPGA or the like, the processor 612 may be specifically configured hardware for conducting the operations described herein. Alternatively, as another example, when the processor 612 is embodied as an executor of software instructions, the instructions may specifically configure the processor 612 to perform the operations described herein.

In an example embodiment, the processor 612 (or the processing circuitry 610) may be embodied as, include or otherwise control the operation of the apparatus 600 based on inputs or data received by the processing circuitry 610. As such, in some embodiments, the processor 612 (or the processing circuitry 610) may be said to cause each of the operations described in connection with the apparatus 600 (e.g., broker 240 or DBA) in relation to generation of default bearers responsive to execution of instructions or algorithms configuring the processor 612 (or processing circuitry 610) accordingly. In particular, the instructions may include instructions for handling the problem of latency associated with space-based communications by establishing deferred bearers and enabling negotiation for such deferred bearers. By using deferred bearers, the system may be enabled to hold on to user data when the network is down or otherwise unavailable in order to provide best effort delivery attempts at a later time. Moreover, the apparatus 600 may be configured to differentiate between bearers based on capability. The apparatus 600 may also be used to provide mechanisms by which to select bearers based on security policy reasons beyond authentication, integrity and confidentiality. In this regard, some security policies may be based on bearer characteristics (or bearer type, such as deferred versus default). The apparatus 600 may also account for pass-planning or other planning to account for future locations of antennas or other equipment defining "moving service areas."

In an exemplary embodiment, the memory 614 may include one or more non-transitory memory devices such as, for example, volatile and/or non-volatile memory that may be either fixed or removable. The memory 614 may be configured to store information, data, applications, instructions or the like for enabling the processing circuitry 610 to carry out various functions in accordance with exemplary embodiments of the present invention. For example, the memory 614 could be configured to buffer input data for processing by the processor 612. Additionally or alternatively, the memory 614 could be configured to store instructions for execution by the processor 612. As yet another alternative, the memory 614 may include one or more databases that may store a variety of data sets responsive to input sensors and components. Among the contents of the memory 614, applications and/or instructions may be stored for execution by the processor 612 in order to carry out the functionality associated with each respective application/instruction. In some cases, the applications may include instructions described herein for establishing and handling deferred bearers.

Some additional details regarding network modifications to support the addition of the deferred bearer will now be described in reference to FIGS. 7-11. In the context of FIGS. 7-11, the term "home network" should be understood to be a network provider whose resources are trusted by a terminal 200. Trust in this case means that the terminal 200 will respond to reservation messages that have been authenticated by the home network, and that the home network controls the broker with which the terminal 200 will communicate during the creation of reservations in the deferred bearer (or deferred data bearer (DDB)) setup. The term "local network" should be understood to be a network controlling the base station to which the terminal 200 is currently attached. This may or may not also be the home network for the terminal 200. If the local network is not the home network for the terminal 200, then the local network must provide the ability to contact the home network as part of DDB setup. The term "support network" may be the network controlling the base station to which the terminal will attach to at a future time as part of establishing the DDB. This may or may not be the local network and the home network. The support network must hold DDB reservations locally until such time as a dedicated bearer can be established and used to communicate with the terminal.

Figure 7:
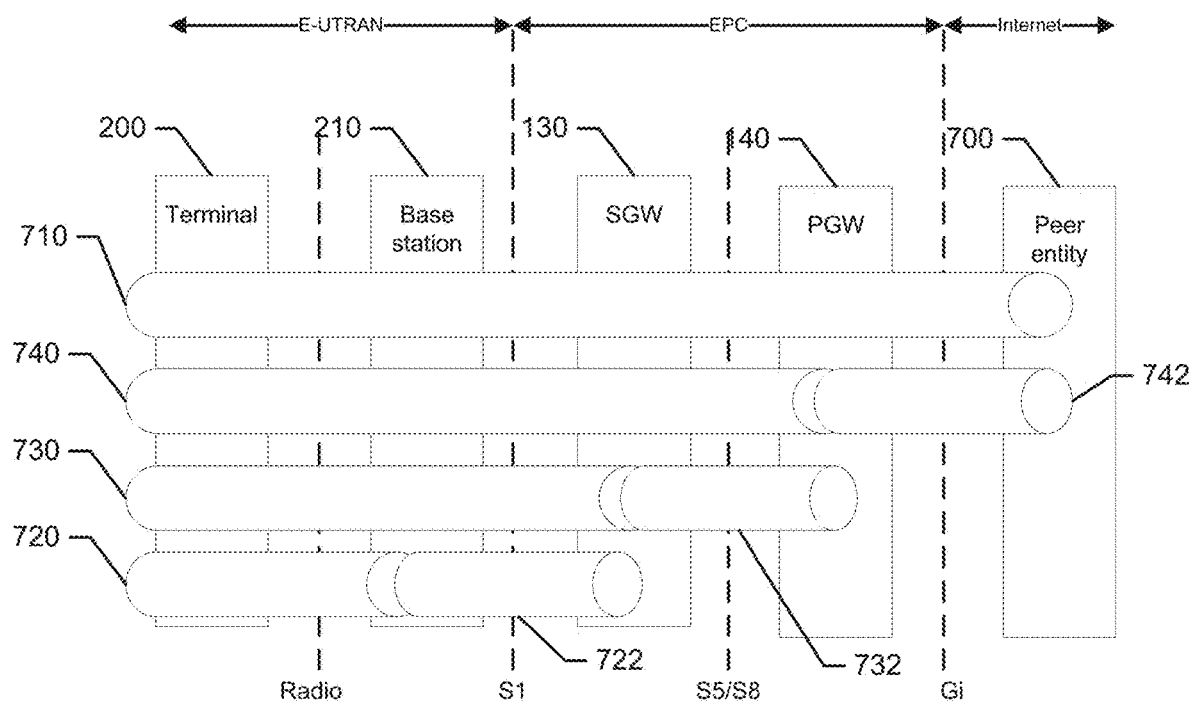
FIG. 7 illustrates an LTE bearer service architecture according to an example embodiment.

A general description of data bearers in a 4G-LTE architecture will first be provided in reference to FIG. 7 in order to establish a background for understanding the changes that the DDB will bring into an S-LTE environment. Referring now to FIG. 7, the E-UTRAN may be considered to include the terminals 200 and base stations 210. The EPC may include the SGW 120 and the PGW 130. A peer entity 700 is also shown, and may be accessible via the Internet 190. End-to-end service in this context may be provided from one of the terminals 200 to the peer entity 700 via a virtual tunnel 710. However, the architecture relies upon the concept of data bearers to construct virtual tunnels between various components of the system. There are a variety of bearers that are instantiated as part of terminal communications and bearers act as nested tunnels for both control and data plane traffic. For example, in the 4G-LTE architecture of FIG. 7, there are multiple bearers that are established as part of normal communications between the terminal 200, the particular network's architecture, and the Internet 190 (e.g., the peer entity 700).

While multiple bearers exist between the terminal 200 and other components of the LTE architecture, they are not independent of each other as implied by the above diagram. The radio bearer 720, which is a one-to-one link between the terminal 200 and the base station 210, carries all traffic from the terminal 200 over the open-air interface (or radio interface). Some of this traffic will be native configuration for the base station 210 and other data will be traffic for the E-UTRAN radio access bearer (E-RAB) 730 and Evolved Packet System (EPS) bearers 740. Similarly, not every bearer exists solely for a terminal 200—those bearers that are instantiated within the infrastructure (e.g., the S1 bearer 722 and the S5/S8 bearers 732) carry traffic from multiple terminals 200 through a particular network's architecture. The S1 bearer 722 (which represents a one-to-many relationship between one of the terminals 200 and the one or more SGWs 120 with which the terminal 200 communicates) is shared by all terminals 200 connected to the base station 210 and carries all traffic from the base station 210 to the SGW 120, including E-RAB 730 and EPS traffic. The S5/S8 bearer 732 carries all traffic between the SGW 120 and the PGW 130, including EPS bearer traffic. Data bearers that terminate into LTE network architecture (other than the PGW 130) carry control-plane traffic for the configuration and maintenance of the network (handovers, physical layer configurations, quality of service negotiations, security authentication) in addition to tunneling user data.

Separately, those data bearers which terminate at the PGW 130 do so to carry user data to the "edge" of the LTE network for handoff to some other packet-data network (PDN) for subsequent delivery. In the case that the PGW 130 interfaces directly with the Internet 190, user IP traffic can be forwarded without issue. In the case that the PGW 130 interfaces with an intranet or some other type of network (such as roaming to a home network), additional "external" data bearers 742 can be constructed to carry this traffic instead.

The EPS bearers 740, combined with the "downstream" network attached to the PGW 130, forms an end-to-end data service (shown by virtual tunnel 710) between the terminal 200 and its applications' destinations. The service spans the distance between a user source and a user destination. Therefore, the construction of EPS bearers 740 is the fundamental mechanism by which terminal applications communicate. There may be multiple EPS bearers instantiated between the terminal 200 and the PGW 130 typically differentiated by quality of service, as noted in FIG. 8.

Figure 8:
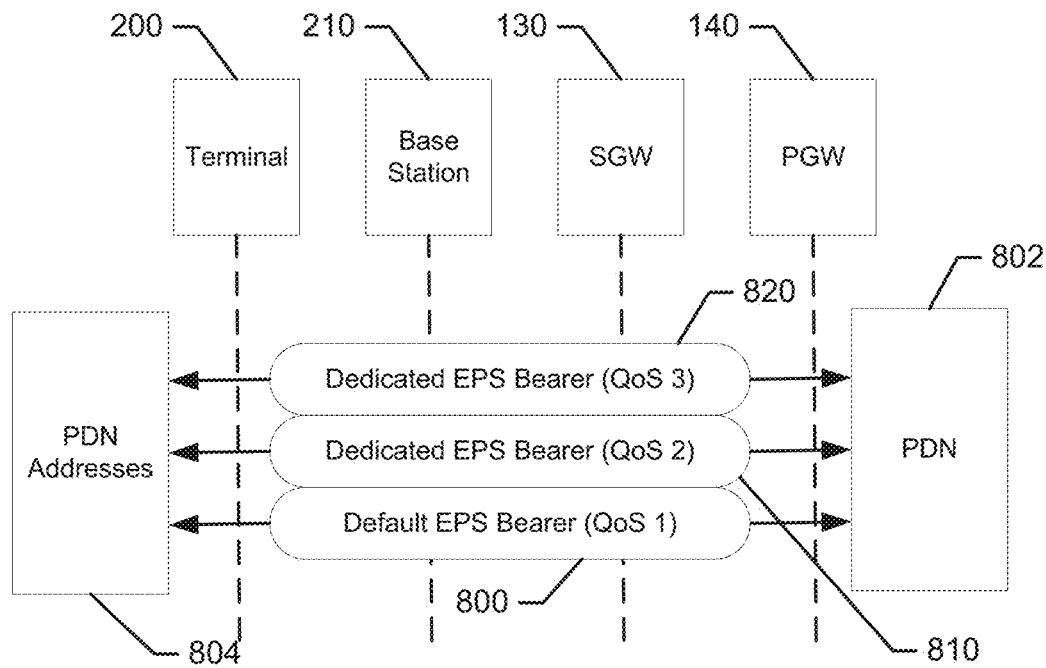
FIG. 8 illustrates bearers differentiated by quality of service in accordance with an example embodiment.

There are two types of EPS bearer that can be instantiated on the terminal 200: the default bearer and one or more dedicated bearers. FIG. 8 shows an example default bearer 800, which is established every time the terminal 200 connects successfully to one of the base stations 210 and serves as a default connection between the terminal 200 and the Internet 190. In this example, the Internet 190 is represented as a packet data network (PDN) 802, and the terminal 200 has a corresponding PDN address 804. Additional dedicated bearers can be established as needed (using the default bearer to support the establishment procedures) to support different quality of service (QoS) and other considerations for data exchange. QoS in this case tied to reserved bandwidth, guaranteed latency, maximum packet loss rates, etc. In some cases, explicit differentiation of available links by their QoS may be used to specify the minimum level of service for the bearer to handle the data that is to be delivered.

There are two kinds of dedicated bearers including those that support a guaranteed bitrate and those that do not. These two kinds of dedicated bearers are typically mapped to real-time traffic (where a guaranteed bitrate must be maintained) and reliable traffic (where data may be re-transmitted for reliability). Real-time traffic is usually considered to be voice, multi-media conference, and other streaming applications. Reliable traffic is usually reserved for bulk data transport. In FIG. 8, a first dedicated bearer 810 is shown having a different QoS than a second dedicated bearer 820.

The LTE data bearer establishment process makes several assumptions relating to the environment in which the process occurs. If any of these assumptions are invalidated by the network itself or by its operating environment, then data bearers will not be successfully established and communication will not be possible. In a traditional LTE use case, the terminal 200 will passively listen for multiple base stations, and selecting the strongest base station 210 with which to establish a connection. This establishment process makes five fundamental assumptions about the nature of the network—none of which are easy to provide when considering a spacecraft as a terminal 200 within an S-LTE architecture.

A first assumption of LTE is that base stations 210 are functionally interchangeable. Different base stations 210 in any LTE deployment are not exactly the same. Some base stations 210 provide a larger coverage area, are more or less susceptible to attenuations, may support more or less front-ends, and may be able to provide hand-overs with more or less overhead and delay. The LTE architecture expects minor differences in the function of the terminals 210 and is generally tolerant of those minor differences.

However, the LTE architecture does assume that base stations 210 can be interchanged without any significant performance degradation to the terminal 200. While some base stations 210 may provide a faster downlink rate than others, all supported data rates will be "fast enough" and as the terminal 200 moves to other coverage areas, switching to a new base station 210 may increase performance. Since the terminal 200 usually attaches to the base station 210 for which the terminal 200 has the strongest connection, there is no consideration of whether the base station 210 provides a strategically better service. This can be problematic for spacecraft treating ground receivers as their base stations 210 for various reasons. For example, some receivers are directional and must be pre-configured for a satellite. Additionally, handover from one receiver to the next may involve a ground receiver in a different administrative area (e.g., in a different country) where frequency allotment is different. Another potential problem includes the fact that data rates for different types of receivers may vary greatly (e.g., from 10 bps to greater than 1 Gbps). Spacecraft may also be unable to connect to random ground stations as a matter of security or other administrative policy. For example, NASA science data may only be allowed to travel over NASA-controlled assets. Thus, a spacecraft cannot treat all base stations 210 as functionally equivalent.

Another assumption of LTE networks that is challenged in an S-LTE context is the assumption that connection to the architecture requires no preparation. The general assumption in LTE is that the base stations 210 do not need any initial preparation in order to receive requests from terminals 200. Transmission from the terminals 200 is often omni-directional, and receipt to the base station 210 is often functionally omni-directional (as a result of multiple antennas being aggregated into the base station 210). The base stations 210 therefore do not receive notice that a terminal 200 is about to broadcast to a particular one of the base stations 210, and the base stations 210 do not require pre-synchronization of a state in order to accept such a broadcast. However, omni-directional antennas do not support high rate communications with spacecraft, because they catch significant interference and attenuation over a pass. Accordingly, most spacecraft antennas are directional. Very high rate data requires either large transmit power at the spacecraft or large antennas on the ground. Since most spacecraft are power constrained, large directional antennas on the ground are generally needed for high data rates. It is also impractical to provide all-sky coverage of fixed position, very large, directional antennas. Accordingly, steerable directional antennas are built to track a spacecraft as the spacecraft passes overhead. Steerable antennas must be pointed, in advance, to catch a spacecraft as it appears over the horizon, track it through its motion, and sometimes help coordinate the next steerable antenna to pick up the spacecraft as the spacecraft leaves the view of the first antenna. For all these reasons, a spacecraft cannot treat base stations 210 as stateless and requiring no advanced preparation.

A third assumption for LTE that is challenged in S-LTE is that network service is either available or not available. The LTE architecture assumes that the terminal 200 is either "within" an area with data coverage (in which case bearers can be created on-demand) or is not in an area of coverage (in which case a bearer cannot be created at all). This assumption stems from the fact that many cell towers provide near omni-present, omni-directional coverage, without a need to pre-plan for connections to a given terminal. Further, it is assumed that as terminals 200 migrate from one coverage area to the next the coverage areas have significant enough overlap to negotiate handoffs (either within the same network provider or across different network providers). This assumption on the availability of the network is problematic for spacecraft since spacecraft often need to prepare data for downlink. The preparation may include compressing, encoding, or migrating amongst different storage media. The preparation may take a long period of time and often must be completed prior to the start of a downlink opportunity. Another reason the assumption regarding availability/non-availability of the network is problematic is that spacecraft may need to configure their telecommunication systems, to include configuring software-defined radios, powering amplifiers, waiting for proper thermal conditions, and maneuvering for pointing. Accordingly, a spacecraft must have some indication of when a transmit opportunity will be forthcoming and to prepare for that opportunity. This adds a third "state" for networking, which is preparing for an upcoming contact. In this way, the network must be either (a) available, (b) unavailable, or (c) pending/in preparation.

A fourth assumption for LTE that is challenged in S-LTE is that contacts do not expire. A data bearer, as part of providing an end-to-end user service, does not have a default "end time" at which point the data bearer is known to no longer be available. If a cellphone stays within a coverage area, network connectivity is not lost whereas if that cellphone leaves a coverage area network connectivity is lost. The nature of the mobility is not planned in advance and, therefore, the network is assumed to be up until such time as the network is not up. While the underlying radio bearer between the terminal 200 and its base station 210 may be disrupted if the terminal 200 enters a standby state, that data bearer can be rapidly re-established when needed without any interruption of the tunneled EPS bearers providing user data exchange. This model is inefficient for spacecraft since spacecraft mobility is much more regular than cellphone mobility and the relationship between a given spacecraft and ground station can be very well characterized in advance, to include when a contact will begin and when the contact will end. Another reason for the model's inefficiency is that spacecraft may also have a sense of how long a contact will be available as part of planning for a pass. If a contact will not be available to transmit an entire data volume, then the spacecraft may not choose to downlink the data over that contact. Thus, within an S-LTE context, spacecraft should be enabled to consider the duration of the contact periods available during planning of downlink opportunities.

A fifth assumption for LTE that is challenged in S-LTE is that networked applications provide recoverability from network failure. When the network is available, LTE control traffic and user application data flow over established bearers without difficulty. When the network is unavailable, application attempts to transmit data simply fail. When an application fails to send data, the application is able to try again at a later time. This approach is problematic in S-LTE since applications on spacecraft produce data in accordance with the purpose of the spacecraft independent of the availability of the network. The data are not re-generated as a function of network availability. Another reason this approach is problematic is that spacecraft must perform preparatory actions to condition data for submission to the network, so that simply failing based on network unavailability would incur the cost of re-preparing data for a future opportunity. Yet another reason this approach is problematic is that spacecraft often have limited storage relative to the overall ability of a spacecraft to produce new data, and creating a second version of data for transmission uses even more storage space than the original form of the data. Accordingly, a spacecraft considers a network failure as a significant event that can endanger future science observations as data can accumulate on the on-board storage, potentially beyond its capacity thus resulting in irrecoverable data loss. For that reason, having a network layer simply reject data without indication of a future contact opportunity complicates data handling.

Based on the assumptions above, which are challenged within an S-LTE context, it may be desirable to ensure that a new mechanism is developed to provide applications residing on certain types of terminals 200 with improved features that enable the shortcomings of LTE relative to operating in a space context to be overcome. In this regard, for example, the DDB concept may provide for features that allow terminals 200 to differentiate base stations 210 based on policy considerations that are separate from base station radio characteristics such as frequency and signal strength. The DDB concept may also enable the base station 210 and spacecraft to both prepare for future contact in advance particularly when using steerable antennas on either the terminal 200 or the base station 210. The DDB concept may also enable networked data to be cached until a data contact is available rather than requiring each application to invent its own data caching and network failure scheme.

Because EPS bearers are the focus of any DDB activity, the DDB concept and workflow is relevant to any version of LTE which provides this concept. This is a particularly relevant observation in that while the 5G specifications incorporate different physical layers and increased heterogeneity on uplink and downlink capabilities, the 5G specifications do not address the motivation for which the DDB exists. Even with the introduction of 5G and accommodations for spacecraft, the architecture continues to make fundamental assumptions on the nature and availability of network assets that prevent certain use cases, as described above. While individual capabilities of these standards may change, the architectural concepts behind them—with regard to the DDB concept—remain the same. The DDB concept will be described in the context of the established 4G-LTE architecture, but its extension to advanced versions of LTE, to include 5G-LTE, are straightforward.

A deferred bearer agent (DBA) 340 may be provided on the terminal 200 and may oversee the deferred bearers that are eventually mapped to a future dedicated bearer. The DBA 340 may represent both the start of the reservation process (e.g., by generating reservation requests) and the end of the reservation process (e.g., by receiving final acknowledgement of the reservations). As such, the DBA 340 is responsible for generating all of the information necessary to handle the reservation, and then initiating the bearer establishment process at the appropriate future time. The DDB may be a proxy data bearer instantiated on the terminal 200 for the sole purpose of storing user data while waiting for a dedicated bearer to be established that can egress the stored data off the terminal 200.

The DDB is therefore provided as a way to insulate applications running on the terminal 200 from the complexity of requesting, preparing for, and using EPS bearers that are scheduled to exist at some future time, but which do not exist at the time when the application produces data for transmission. As discussed above, this occurrence can happen in a variety of extreme and otherwise challenged networking environments and is particularly frequent in space-terrestrial internetworks.

The DDB acts as a proxy dedicated EPS bearer, which accepts data from terminal applications while requesting the network to provision future resources for the downlink of that data. In instances where the terminal 200 already has an EPS bearer capable of transmitting the data, the DDB is not necessary and may either be a simple pass-through or otherwise the DDB may be bypassed completely by connecting the terminal application directly to the appropriate EPS bearer. However, when used, the DDB may periodically request confirmation that a future dedicated EPS bearer is waiting to be established at a future time. When the future data bearer is so established, the DDB will be attached to the future data bearer and ensure that only the future data bearer is used to convey the cached application traffic associated with the DDB.

The DDB concept therefore provides a number of useful functions that can enable LTE to function in challenged environments such as those that are present when spacecraft communications are involved. For example, the DDB may be instantiated as a local proxy for a later dedicated EPS bearer (e.g., a future data bearer) and the process of establishing that future data bearer and attaching the future data bearer to the DDB enables the application of policy and other concerns when determining which dedicated EPS bearer may or may not carry cached DDB traffic. The existence of the DDB prior to the establishment of the future data bearer, and the potential for provision of a request for the future data bearer some time in advance of establishment of the future data bearer, means that the DDB concept provides advanced notice to both the terminals 200 and the base stations 210 (e.g., the future base station 210 for which contact will be established at a future time) to both prepare for the future data transmission. The DDB is also assumed to have significant allocated storage to keep application data until such time as the data expires or a dedicated EPS bearer (i.e., the future data bearer) can be established. In doing so, the application need not be the sole persister of its own data.

The decision that a dedicated EPS bearer (or the default EPS bearer) is not sufficient to carry a particular data volume may include more than checking for the existence of such a bearer. For example, consider a scenario where the terminal 200 is a spacecraft running an application that produces a large data volume such that a "high rate" downlink is required to communicate the data volume in the context of a pass over a ground station. When the data volume is produced, if such a ground station exists, the standard LTE bearer establishment process can be used to create bearers supporting an end-to-end service and the data can be communicated without any issue. However, if no contact exists, or the contact is "low rate" and unable to handle the entire data volume, then the DDB concept may enable the data volume to be accepted by the LTE layer, placed in data storage, and a request for a high-rate contact sent through the system. If and when such a reservation can be made, then when the future data bearer is established to provide that reservation, the original data volume can be removed from storage and sent, without requiring any additional processing or information from the application.

The DDB is used to carry user traffic from the user plane, and not control plane traffic used for RRC. The user plane includes traffic generated by applications and passed to the LTE layer for transmission. In this case, user traffic is assumed to be internet protocol (IP) traffic, but could also be bundle protocol (BP) traffic or any other protocol data units (PDU) used by applications. The traffic is intercepted by the DBA 340, which determines whether a suitable data bearer exists to carry the traffic. If such a suitable data bearer exists, the traffic is passed to the PDCP and continues its egress from the terminal. If a suitable bearer is not found, then the traffic is held in the DBA 340 and a reservation request is passed to the PDCP instead. The control plane includes RRC, and the information is tactical in nature and managed the interfaces between the terminal 200 and its base station 210. This traffic by definition only exists and is useful when there are existing connections with the base station 210 and, therefore, are not considered as part of the DBA 340 process.

Figure 9:
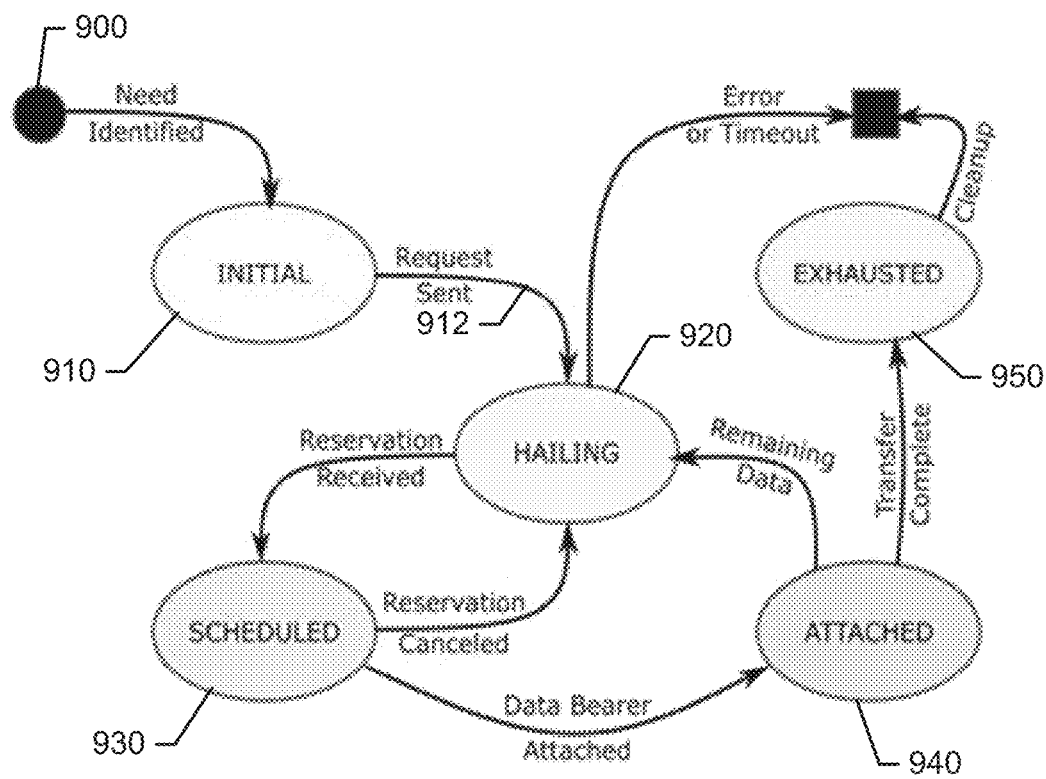
FIG. 9 illustrates a diagram of the lifecycle of a deferred data bearer in accordance with an example embodiment.

The creation of the DDB at the terminal 200 begins with a determination that an appropriate data bearer does not currently exist (e.g., due to suitability criteria not being met). When the suitability criteria are not met, the data that is otherwise to be transferred must be stored and data bearer responsibilities deferred to a later time. The DDB is destroyed when the data volume that caused creation of the DDB has been transmitted off the terminal 200 and into the network, or if the DDB times out or experiences some other error that removes the possibility that the DDB would eventually attach to a data bearer. The lifecycle of the DDB is illustrated in FIG. 9. In this regard, a need is identified at operation 900, and then an initial state exists for the DDB at operation 910. The DDB exists in the initial state while terminal resources for the data are being provisioned. The provisioning may include ensuring that sufficient storage is available on the terminal 200, and that the DDB itself is assigned appropriate identification and authentication information, which can be used to associate the future data bearer with the traffic that will be stored for the DDB. The DDB leaves the initial state when a reservation request that is ready to be sent (as shown by request 912) into the larger LTE network. In an example embodiment, transitioning into the initial state may require identification of a need for the DDB. The identification of the need for the DDB may involve making the determination that no existing data bearer meets the requirements for transmitting the data volume. In this regard, the DDB may be required if there is no end-to-end service available on the terminal 200, if all available end-to-end services available on the terminal 200 cannot be used because of a policy configuration on the terminal 200, and/or if any useable end-to-end services on the terminal 200 are being used by a higher priority user than the terminal 200.

Responsive to the request 912, hailing may be undertaken as shown at operation 920. A DDB exists in the hailing state while a response to the reservation request 912 into the network has not yet received a response. While in the hailing state, the DDB may request that a new reservation request be sent at regular intervals. The DDB leaves the hailing state if there is a persistent error with sending a reservation, if some timeout is reached such that the DDB is no longer necessary, or if a reservation has been confirmed by the LTE network. Transitioning into the hailing state may occur any time a reservation must be requested by the network at large. The conditions for transitioning into the hailing state may include: 1) a DDB has just been created and a reservation request has been built for the DDB and must be sent for the first time, 2) a previously acknowledged reservation request has been canceled and the DDB must now request a new reservation be created at a different time, and 3) a previously attached data bearer is no longer active and data associated with the DDB still exists and, therefore, a new reservation for the remaining data volume must be resent to create a new reservation.

As noted above, the reservation request may be sent in association with entering the hailing state, but periodic resends of the reservation request may be made at a predefined interval until a response is received. That said, the hailing state may end based on termination criteria. The termination criteria may include the length of time after an attempting to send a reservation request expiring due to there not being a data bearer to carry the request. Termination criteria may also be based on the length of time to wait after successfully sending the reservation request to receive a reservation response back from the network, prior to re-sending the reservation request. Another termination criterion may be based on how long to wait for a reservation request before determining that the reservation will not be acknowledged and the DDB should be abandoned.

The DDB may also have a scheduled state as indicated by operation 930. The scheduled state may exist when a reservation has been made in the system and the reservation information has been used to configure the local DDB storage mechanism on the terminal 200 (e.g., memory 614). This includes the timers associated with when to request a future bearer. A DDB in the scheduled state is responsible for initiating a new data bearer request at the expected time, associating the data bearer request with the DDB, and waiting for the new data bearer to be attached. The DDB leaves the scheduled state when an error is encountered such that the reservation is no longer considered valuable or when the data bearer associated with the reservation is created and available to take data. Transitioning to the scheduled state may occur when reservation response is received by the network. When initially entering into the scheduled state, the DDB must perform activities, including identifying information associated with the reservation including policy and security information, for storage with the DDB object. The schedule and associated frequency and data rate information for the reservation must be stored in the DDB storage mechanism upon entering into the scheduled state. Additionally, a timer may be started to note when the DDB should begin the process of establishing a data bearer for the corresponding reservation.

The DDB may also be in an attached state as shown by operation 940. The DDB is in the attached state when a data bearer is active on the terminal 200, which can transmit the data volume for which the DDB was originally created. The DDB stays in the attached state until the entire data volume has been communicated or until the data bearer has been exhausted. Transitioning to the attached state happens when an end-to-end service exists on the terminal 200, which utilizes a data bearer that can be associated with the reservation. At that time, any data associated with the reservation and stored by the DDB can be transmitted over the data bearer. While the DDB is attached to a data bearer, no other application traffic should be used by the same data bearer. Put another way, the DDB should be the highest priority user of the data bearer for which the DDB has been created.

The DDB may also have an exhausted state. The DDB is in the exhausted state when the data volume for which the DDB was created has been exhausted and all reservation and other resources associated with the DDB can be removed from the terminal 200. Once all resources on the terminal 200 have been cleaned, the DDB may be destroyed. Transitioning into the exhausted state may occur when there is no more data associated with a DDB, either because all data has been transmitted, the data is no longer considered relevant, or there is no remaining likelihood of finding a reservation. The likelihood of finding a reservation may be associated with the length of time since making the request (e.g., expiration of a timer).

The DDB object itself may include information that identifies the reservation request that was sent to the network. The DDB object may also include any reservation response received by the network and any annotative information as to whether the dedicated bearer is requested as being guaranteed, best effort or unknown. The DDB object may also include a DDB identifier, which may be unique identification information that identifies the DDB object distinctly relative to other DDB objects. The DDB object may also include metrics associated with the data for the DDB (e.g., data IDs, number of bytes, etc.) and/or metrics associated with the lifecycle of the DDB itself (e.g., timeouts, errors, mode and state, etc.). In some cases, the DDB object may further include a time indicating when a request for a dedicated EPS bearer should be made (with the expectation that the appropriate base stations will be in position and properly configured). The DDB object may also include authentication information that is to be matched to a future dedicated EPS bearer when the bearer is established.

The DBA (e.g., apparatus 600) may run on the terminal 200 and intercept user plane traffic to determine whether user traffic should pass through the PDCP or be stored for later transmission due to the need for a DDB. The main responsibilities of the DBA include determining data bearer suitability, storing user traffic, requesting a dedicated EPS bearer reservation, initiating dedicated bearer establishment, binding a DDB to a dedicated EPS bearer, and expiring exhausted or expired resources.

With respect to determining suitability, it should be appreciated that there may be multiple data bearers on the terminal 200 to the attached base station, which could carry user traffic. The DBA may be configured to determine whether any of these multiple data bearers are suitable for communicating a volume of data associated with a particular user message. The DBA may make the determination regarding suitability based on suitability criteria. The suitability criteria may include determining whether there are no bearers on the terminal 200, or whether existing bearers terminate to unapproved PCGWs. The suitability criteria may also or alternatively include determining whether existing bearers do not support minimum data rates or frequencies, or whether the existing bearers are not terminating in the home network of the terminal 200. In some cases, the suitability may also or alternatively include determining whether existing bearers cannot be verified as being trustworthy by the home network of the terminal 200.

If no suitable bearer exists (i.e., the suitability criteria are not met), the DBA may be configured to store user traffic (e.g., in memory 614) until a suitable bearer is established on the terminal 200. The storage of user traffic in this way requires that the DBA persist the information and that user traffic is annotated in some way so that the user traffic can be found and the bearer suitability can be evaluated. For requesting the dedicated bearer reservation, the DBA constructs the reservation request while the data for which no suitable bearer exists is being stored. In some cases, there may be a single reservation request per piece of user data. However, it is often the case that a reservation request may cover a larger data volume of collected information. When the DBA determines that it is time for an acknowledged reservation in the system to occur (e.g., that it is time to activate a future data bearer that was previously reserved), the DBA may initiate establishment of the dedicated bearer using LTE establishment mechanisms.

The attach procedure for creating a dedicated bearer may include a secure token associated with the origination of the dedicated bearer. The secure token may match the token returned to the DBA as part of the original reservation establishment. Whenever a new dedicated bearer is created, the token associated with the new dedicated bearer may be examined to see if the token matches the tokens of any existing reservations on the DBA. If a match is found, then all traffic stored on the DBA for the corresponding reservation is egressed over the respective dedicated bearer. Periodically, the DBA must maintain its storage (e.g., memory 614) such that abandoned user data does not exhaust all available memory space. Data provided to the network may therefore be provided with a time to live associated with therewith, in which case any data which persists beyond the time to live that is prescribed should be deleted. Additionally, if at any time the DBA determines that a reservation request will not be met, data associated with the corresponding reservation may be deleted.

A bearer reservation (BR) may include the set of information necessary to map one or more DDBs to the dedicated bearer that will eventually carry the data. BRs may be established via the BR Request Protocol (BRRP). The BRRP may be a protocol used to request the creation of BRs in a system, which may involve communication amongst the DBA, home reservation broker ((HRB)—e.g., broker 240), and one or more future bearer providers (FBPs). The FBP is any entity that is able to provide a dedicated data bearer to the DBA on the terminal 200 at a time in the future in accordance with a tactical reservation request. Tactical reservations are created by the FBP and stored for future authentication and also forwarded back to the HRB for communication back to the DBA on the terminal 200. The HRB exists on a user's home network provider and serves as a gateway between the two functions of the reservation process. The HRB receives "strategic" reservation requests from the DBA and makes tactical reservation requests to one or more FBPs. The DBA only uses the HRB for reservation creation as a matter of operational security. A strategic reservation request (SRR) is a request that is made by the DBA and represents the total known data service needed by the DBA to egress the on-board data volume for the reservation. A tactical reservation request (TRR) may be a request made by the HRB to one or more FBPs to accommodate a single SRR. In cases where a single asset at a single FBP can accommodate the egress needs of a SRR, then there will be one TRR to satisfy the SRR. In cases where either multiple assets at a single FBP or multiple assets across multiple FBPs are required to provide egress, multiple TRRs may be made to satisfy the SRR.

Figure 10:
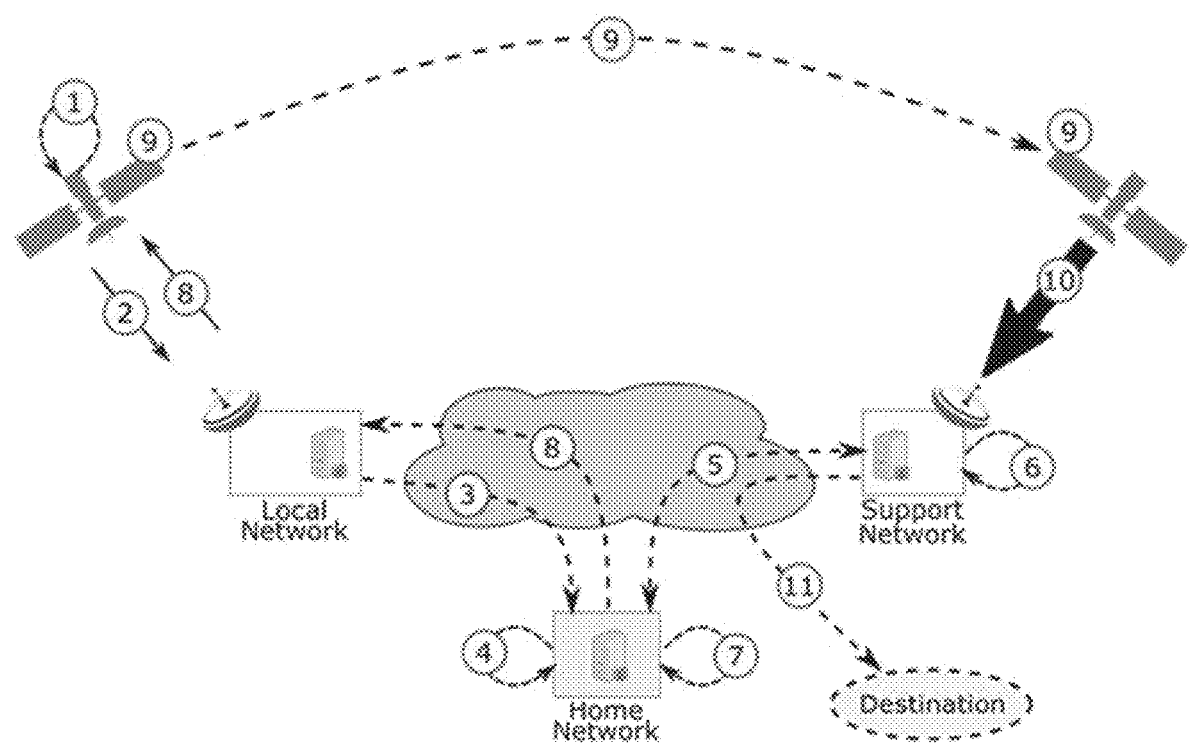
FIG. 10 illustrates a diagram of the operation of the reservation system in accordance with an example embodiment.

The DDB concept is more encompassing than just the instantiation of a DDB object on the terminal 200. Thus, an example of the off-UE processes, which includes the reservation system will now be described in reference to FIG. 10. FIG. 10 includes an example system involving a spacecraft. In this example, a spacecraft (e.g., a satellite) determines while over some local network—that the spacecraft must reserve time on a future ground station provided by some support network to complete the transmission of data on the spacecraft. This situation is illustrated in FIG. 10 with significant processing steps enumerated 1-11.

In step 1 of FIG. 10, the terminal 200 decides that a DDB is necessary and constructs the reservation request for a future data bearer to carry its data. At step 2, the reservation request is transmitted to a ground entry point over a data bearer providing a low-rate or other end-to-end service that is (a) sufficient to carry the reservation request and (b) insufficient to carry the overall requested data volume. At step 3, the reservation request, which is addressed to the spacecraft's home network, is tunneled to the home network as part of the end-to-end user service provided by the local network to which the spacecraft is attached. At step 4, the home network determines which potential ground entry providers would be suitable to satisfy the transmission request. This determination may involve using public or private ground entry points, engaging with a public marketplace with such points, or some other selection process. At step 5, once selected, the reservation request may be sent to the ground entry point, which responds with success and details about the future contact. At step 6, the future ground entry point saves security, policy, and configuration information relating to the reservation that it has acknowledged. At step 7, steps 5 and 6 are repeated until the home network determines that the full set of user data can be accommodated by the set of reservations negotiated with various support networks. At step 8, when completed, the set of reservations are sent back to the terminal 200 over an end-to-end service. Depending on the time it takes to complete steps 3-7 above, it may be possible that the end-to-end service back to the terminal 200 will take a different path, through a different network. At step 9, the terminal 200 may store and carry the information until such time as the terminal 200 is located over a ground entry point that has been reserved. At step 10, the terminal 200 requests a data bearer using the authentication information provided by the reservation, establishes the bearer, associates the bearer with the DDB, and transmits user information. At step 11, the dedicated bearer terminates at the egress destination of the terminal's application.

The BRRP is used to communicate reservation requests and responses amongst the DBA, HRB, and FBP. The BRRP is used for the communication of both strategic and tactical reservation requests. The BRRP includes the following four message types: strategic reservation request messages (SRRM), tactical reservation request messages (TRRM), tactical reservation messages (TRM), and canceled reservation override messages (CROM).

The SRRM may be sent from the DBA to its HRB whenever the DBA creates a new DDB. The contents of the SRRM may include a DBA-unique SRRM identifier, the address of the HRB which should process the corresponding message, timeliness information associated with the reservation and the resultant DDB, required and requested RF characteristics of the DDB, and pending data characteristics. The timeliness information may include a need-by date for the reservation to be acknowledged, a need-by date for the deferred bearer to be provided, and/or a need-by date for data egress to be completed off the terminal 200. Required and requested RF characteristics of the DDB may include a frequency, minimum data rate, and/or the like. Pending data characteristics may include, for example, overall data volume, QoS, etc. The SRRM must be signed by the DBA on the terminal 200 and should be encrypted. In both cases (i.e., for signature and for encryption) the DBA's public key may be used.

The TRRM is sent from the HRB to one or more FBPs in the system. The TRRM may exist for cases where a single FBP cannot completely satisfy the SRRM to enable the SRRM to be segmented into multiple smaller, satisfiable TRRM messages that, in total, can cover the SRRM request. The TRRM may also exist for cases where the HRB wishes to hide aspects of the SRRM request for certain FBPs. In such cases, the TRRM may be created to make a modified data request to handle portions of the DBA egress even if the FBP could otherwise provide the full DBA egress. The TRRM may include a DBA-unique TRRM identifier, timeliness information associated with the reservation and the resultant DBB, required and requested RF characteristics of the DDB, and pending data characteristics. Like the SRRM, the timeliness information of the TRRM may include a need-by date for the reservation to be acknowledged, a need-by date for the deferred bearer to be provided, and/or a need-by date for data egress to be completed off the terminal 200. Similar to the SRRM, the required and requested RF characteristics of the DDB for the TRRM may include a frequency, minimum data rate, and/or the like. Pending data characteristics may also include, for example, overall data volume, QoS, etc. The TRRM may be signed by the DBA on the terminal 200 and may be encrypted (unlike the SRRM, where these are not optional). In both cases (i.e., for signature and for encryption) the HRB's public key may be used.

The TRM may include details of when and how a dedicated data bearer can be requested from the FBP. The information included in the TRM may therefore include information indicating when the terminal 200 should make a dedicated bearer request. The TRM may include an SRRM Identifier for which the TRM is satisfying some (or all) egress needs, a TRM identifier that uniquely identifiers the corresponding reservation, bearer information and/or an indication of other TRMs that are made obsolete by the TRM. The bearer information may include RF characteristics such as frequency, rate, etc., and time information (e.g., start and stop times). The home bearer broker (HBB e.g., broker 240) must ensure that the TRM identifier is unique amongst all TRMs sent to a particular DBA. The TRM must be signed by the HBB and should be encrypted by the HBB such that only the DBA is able to verify and/or decrypt the message.

If at any time the HBB determines that an SRRM cannot be serviced by any FBP, then a CROM may be sent to the terminal 200 indicating that all data associated with the reservation should be deleted and no additional requests for the corresponding reservation should be passed into the system. When the CROM is sent, all FBPs may also be notified so the FBPs can release resources. The CROM, therefore, is sent from the HBB to both the DBA and FBPs. The CROM may include an SRRM identifier of the reservation being canceled and a list of all TRMs that are being canceled. The CROM must be signed by the HBB and should be encrypted by the HBB.

Figure 11:
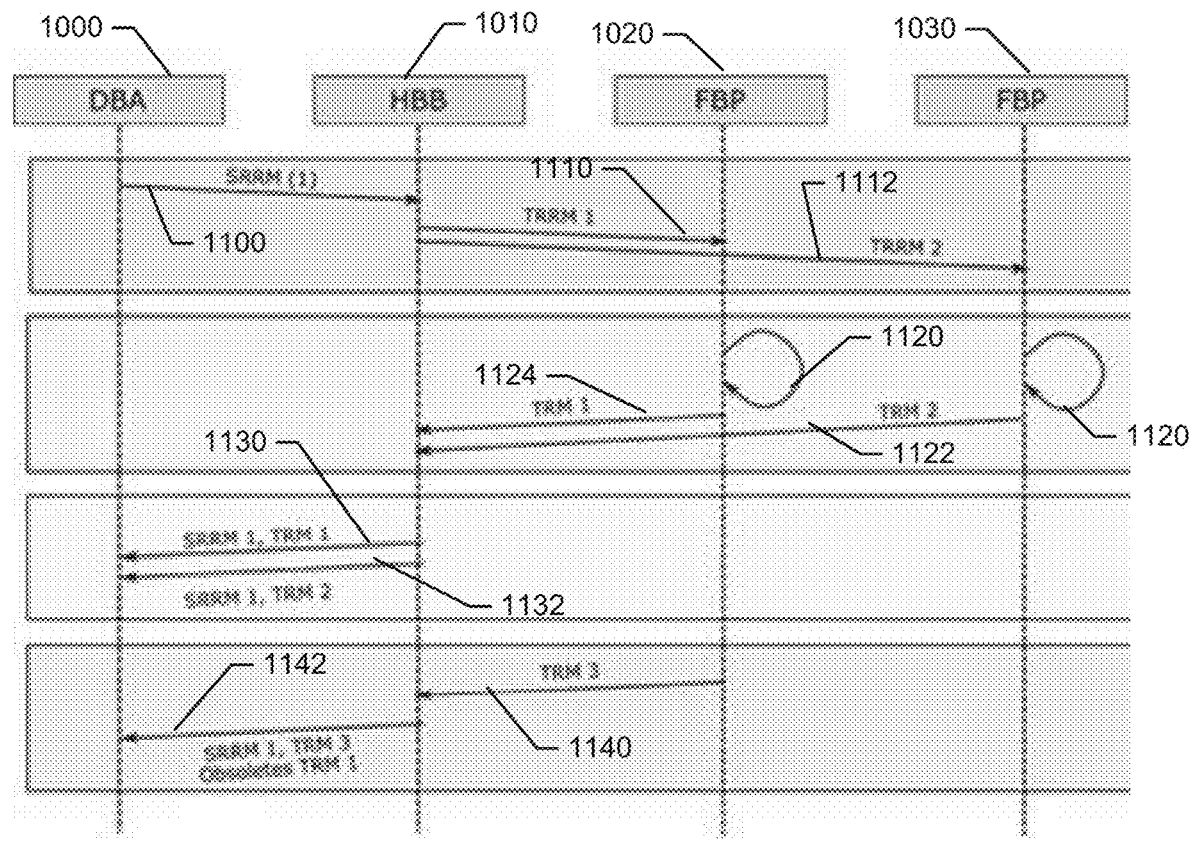
FIG. 11 illustrates a data flow in the bearer reservation request protocol in accordance with an example embodiment.

FIG. 11 shows an example data flow in accordance with an example embodiment. In this regard, a DBA 1000, an HBB 1010, a first FBP 1020, and a second FBP 1030 may all play a role in the data flow as shown in FIG. 11. An SRRM may be sent from the DBA 1000 to the HBB 1010 as indicated by message 1100. The HBB 1010 may communicate a TRRM to each of the first and second FBPs 1020 and 1030 at messages 1110 and 1112, respectively. The first and second FBPs 1020 and 1030 may each determine whether they can meet the TRRM and store the corresponding information at message 1120. The first and second FBPs 1020 and 1030 may also send a TRM back to the HBB 1010 at messages 1122 and 1124, respectively. Thereafter, the HBB 1010 may collect TRMs within a finite period of time and send the set back to the DBA 1000 as shown by messages 1130 and 1132. Each TRM is also associated with one or more SRRMs. If a TRM becomes invalid for any reason, a new TRM can be generated to obsolete a prior TRM as shown at messages 1140 and 1142. In an example embodiment, identifiers in the system may be provided by OAUTH tokens.

In an example embodiment, a system may include an SGW 120 operably coupled to a PGW 130 to setup a session responsive to a request from a terminal 200 to establish the session between the terminal 200 and the PGW 130. The system further includes an MME 220 configured to authenticate the terminal 200 and provide bearer management in response to the request. The MME 220 is configured to provide bearer information to the SGW 120. The system also includes a plurality of base stations 210 operably coupled to the SGW 120 via a data plane connection and operably coupled to the MME 220 via a control plane connection. The base stations 210 may be configured to handover connection to the terminal 200 between the base stations 210 in response to movement of the terminal 200 between coverage areas of the base stations 210. The MME 220 may be configured to assign a deferred bearer in response to a determination that suitability criteria for establishing an active bearer are not met, the deferred bearer reserving a future data bearer and signaling the terminal 200 to store data locally until the future data bearer is established.

In some embodiments, the method may include additional, optional operations, and/or the operations described above may be modified or augmented. Some examples of modifications, optional operations and augmentations are described bellow. It should be appreciated that the modifications, optional operations and augmentations may each be added alone, or they may be added cumulatively in any desirable combination. In an example embodiment, the MME 220 may be configured to provide authentication of terrestrial-based terminals using terminal identity information (e.g., an IMEI) and be configured to provide authentication of one or more terminals 200 located on spacecraft via an identifier associated with space-capable terminals 200. In an example embodiment, the MME 220 may be configured to assign a deferred bearer when a current default bearer is determined unsuitable for the current data flow with a terminal 200, and to provide the bearer information to the SGW 120 identifying the deferred bearer. In some cases, identification of the deferred bearer to the terminal 200 may trigger the terminal 200 to store data associated with the deferred bearer until a future data bearer is available. The suitability criteria may include minimum data rates or minimum security requirements for data that is to be transferred, or resource availability requirements. In an example embodiment, the system may further include a broker configured to define a brokering service to make requests for the future data bearer. In some cases, the broker may be configured to utilize knowledge of a future location of the at least some of the base stations 210 that are mobile to reserve the future data bearer at a future contact time. In an example embodiment, the broker may be configured to negotiate access to the future data bearer across different types of networks. In some cases, the different types of networks may include at least one terrestrial wireless communication network and at least one space-based wireless communication network. In an example embodiment, a protocol stack of each of the terminals and the base stations may include an RLC layer, and a CRCI configured to provide an interface between RLC functions of the RLC layer and RF-specific capabilities. The CRCI may define an abstract interface between RLC functions and RF-specific capabilities. In some cases, the CRCI maps RLC logical channel mapping functions to corresponding physical layer attributes.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A wireless communication system comprising:
a serving gateway (SGW) operably coupled to a packet data network gateway (PGW) to setup a session responsive to a request from a terminal to establish the session between the terminal and the PGW;
a mobility management entity (MME) configured to authenticate the terminal and provide bearer management in response to the request, the MME being configured to provide bearer information to the SGW; and a plurality of base stations operably coupled to the SGW via a data plane connection and operably coupled to the MME via a control plane connection, the base stations being configured to handover connection to the terminal between the base stations in response to movement of the terminal between coverage areas of the base stations, wherein the MME is configured to assign a deferred bearer in response to a determination that suitability criteria for establishing an active bearer are not met, the deferred bearer reserving a future data bearer and causing the terminal to store data locally until the future data bearer is established, wherein a protocol stack of each of the terminal and the base stations includes:
a radio link control (RLC) layer; and
a common radio frequency channel interface (CRCI) configured to provide an interface between RLC functions of the RLC layer and RF-specific capabilities, wherein the CRCI maps RLC logical channel mapping functions to corresponding physical layer attributes.

2. The system of claim 1, wherein the MME is configured to provide authentication of terrestrial-based terminals using terminal identity information and configured to provide authentication of one or more terminals located on spacecraft via an identifier associated with space-capable terminals.

3. The system of claim 1, wherein the suitability criteria include minimum data rates or minimum security requirements for data that is to be transferred.

4. The system of claim 1, wherein the suitability criteria include resource availability requirements.

5. The system of claim 1, further comprising a broker configured to define a brokering service to make requests for reserving the future data bearer.

6. The system of claim 5, wherein the broker is configured to utilize knowledge of a future location of at least some of the base stations to reserve the future data bearer at a future contact time.

7. The system of claim 5, wherein the broker is configured to negotiate access to the future data bearer across different types of networks.

8. The system of claim 7, wherein the different types of networks include at least one terrestrial wireless communication network and at least one non-terrestrial wireless communication network.

9. An apparatus for establishing a deferred bearer in a wireless communication system supporting communication between both terrestrial and space-based terminals, the system comprising a serving gateway (SGW) operably coupled to a packet data network gateway (PGW) to setup a session responsive to a request from a terminal to establish the session between the terminal and the PGW, wherein the apparatus comprises processing circuitry configured to define a brokering service to make requests for the deferred bearer by reserving a future data bearer in response to suitability criteria not being met for establishing an active bearer, and wherein a protocol stack of each of the terminal and a plurality of base stations includes:
a radio link control (RLC) layer; and
a common radio frequency channel interface (CRCI) configured to provide an interface between RLC functions of the RLC layer and RF-specific capabilities, wherein the CRCI maps RLC logical channel mapping functions to corresponding physical layer attributes.

10. The apparatus of claim 9, wherein the apparatus is operably coupled to a mobility management entity (MME) configured to provide authentication of the terminal and bearer management in response to a request to establish the session between the terminal and the PGW, wherein the brokering service is configured to provide bearer information to the SGW via the MME, and wherein the brokering service is configured to provide the bearer information to the SGW identifying the deferred bearer.

11. The apparatus of claim 10, wherein the MME is configured to provide authentication of terrestrial-based terminals using terminal identity information and configured to provide authentication of the at least some of the terminals that are located on spacecraft via an identifier associated with space-capable terminals.

12. The apparatus of claim 10, wherein identification of the deferred bearer to the terminal triggers the terminal to store data associated with the deferred bearer until a future data bearer is available.

13. The apparatus of claim 12, wherein the apparatus is configured to utilize knowledge of a future location of the base stations that are mobile to reserve the future data bearer at a future contact time.

14. The apparatus of claim 13, wherein the apparatus is configured to negotiate access to the future data bearer across different types of home networks.

15. The apparatus of claim 14, wherein the different types of home networks include at least one terrestrial wireless communication network and at least one space-based wireless communication network.

16. A method for allocating bearers in a wireless communication system including terrestrial assets and space-based assets, the method comprising:
receiving, by a mobility management entity (MME), an attachment request from a terminal;
selecting, by the MME, a corresponding serving gateway (SGW) and packet data network gateway (PGW) responsive to authentication of the terminal by the MME;
determining, by a broker in communication with the MME, whether suitability criteria are met; and
assigning, by the broker, a default or dedicated bearer if the suitability criteria are met, or assigning a deferred bearer if the suitability criteria are not met,
wherein the terminal stores data associated with the deferred bearer until a future data bearer is available,
wherein knowledge of a future location of a base station is used to reserve the future data bearer at a future contact time, and
wherein a protocol stack of each of the terminal and base stations includes:
a radio link control (RLC) layer; and
a common radio frequency channel interface (CRCI) configured to provide an interface between RLC functions of the RLC layer and RF-specific capabilities, wherein the CRCI maps RLC logical channel mapping functions to corresponding physical layer attributes.

17. The method of claim 16, further comprising negotiating access to the future data bearer across different types of networks.

18. The method of claim 17, wherein the different types of networks include at least one terrestrial wireless communication network and at least one space-based wireless communication network.

\* \* \* \* \*